United States Patent [19]
Yasumuro et al.

[11] Patent Number: 4,783,233
[45] Date of Patent: * Nov. 8, 1988

[54] METALLIC CONTAINER HAVING A CIRCUMFERENTIAL BONDED PORTION AND PROCESS FOR PRODUCTION THEREOF

[75] Inventors: Hisakazu Yasumuro, Yokohama; Tsuneo Imatani, Yokosuka; Michio Watanabe, Yokohama; Hideo Kurashima, Yokosuka; Kazuhisa Ishibashi, Tokyo, all of Japan

[73] Assignee: Toyo Seikan Kaisha Limited, Tokyo, Japan

[*] Notice: The portion of the term of this patent subsequent to Aug. 20, 2002 has been disclaimed.

[21] Appl. No.: 941,584

[22] Filed: Dec. 16, 1986

Related U.S. Application Data

[63] Continuation of Ser. No. 550,622, Nov. 10, 1983, abandoned.

[30] Foreign Application Priority Data

| Nov. 16, 1982 | [JP] | Japan | 57-199823 |
| Dec. 7, 1982 | [JP] | Japan | 57-213279 |
| Dec. 7, 1982 | [JP] | Japan | 57-213351 |
| Dec. 10, 1982 | [JP] | Japan | 57-215513 |

[51] Int. Cl.$^4$ ............... B32B 31/12; B32B 31/28
[52] U.S. Cl. ............... 156/227; 156/69; 156/272.4; 156/274.6; 156/275.3; 156/294; 219/10.53

[58] Field of Search ............... 156/321, 69, 73.1, 73.5, 156/82, 196, 200–203, 227, 217–218, 223, 272.2, 272.4, 275.1, 275.3, 275.5, 293, 294, 274.6; 413/1, 69; 53/451, 551, 373; 219/10.75, 10.79, 10.53

[56] References Cited

U.S. PATENT DOCUMENTS

| 2,728,703 | 12/1955 | Kiernan | 156/321 |
| 2,920,173 | 1/1960 | Wästberg | 219/10.53 |
| 3,676,271 | 7/1972 | Hake et al. | 156/567 |
| 3,770,555 | 11/1973 | Gladstone et al. | 156/306.9 |
| 3,824,138 | 7/1974 | Karobath et al. | 156/198 |
| 4,174,988 | 11/1979 | Moore et al. | 156/213 |
| 4,280,268 | 7/1981 | Gordon | 156/294 |
| 4,430,142 | 2/1984 | Ochi et al. | 156/274.4 |
| 4,451,316 | 5/1984 | Ishibashi et al. | 156/275.3 |
| 4,472,219 | 9/1984 | Taira | 156/294 |
| 4,536,243 | 8/1985 | Imatani | 156/294 |

Primary Examiner—Merrell C. Cashion, Jr.
Attorney, Agent, or Firm—Wenderoth, Lind and Ponack

[57] ABSTRACT

A metallic container composed of a first and a second section each composed of a metallic cup-like fabricated article having a primer coating, the two sections being lap-bonded at their circumferential open end portions by means of a thermoplastic film-like adhesive. A process for producing said metallic container is also provided which comprises a fabricating step of producing the first and second sections, an adhering step of heat-adhering a film-like adhesive to the peripheral surface of the open end portion of the second section to be laid inwardly, and a bonding step of bonding the open end portions of the first and second sections. In the metallic container, the film-like adhesive, forming a circumferential overlapping portion, is adhered to the edge of the open end portion of the second section and its inner circumferential surface following the edge.

5 Claims, 12 Drawing Sheets

Fig. 2
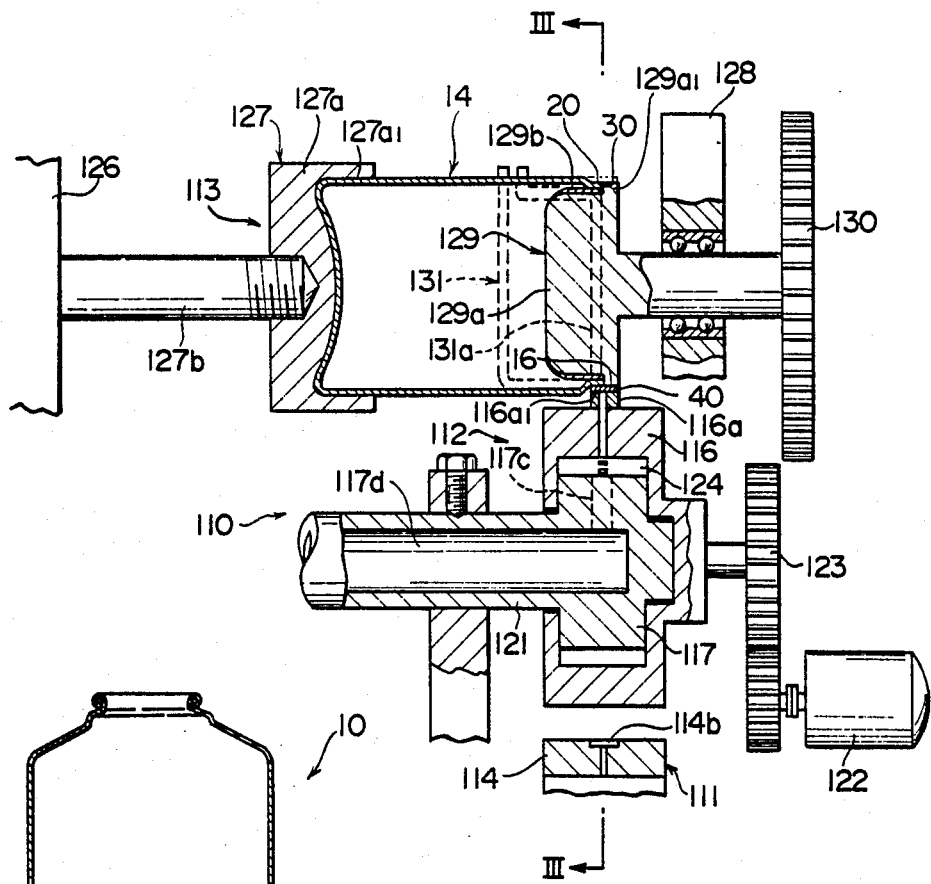
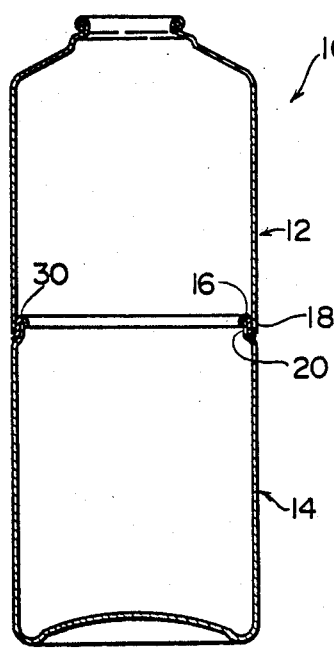
Fig. 1

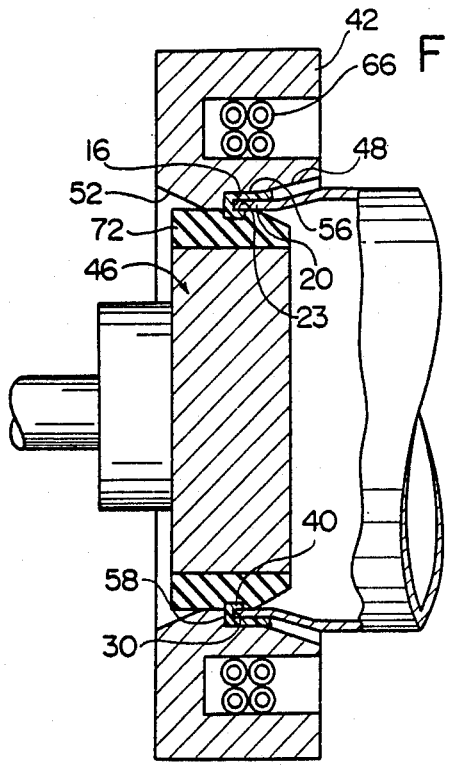
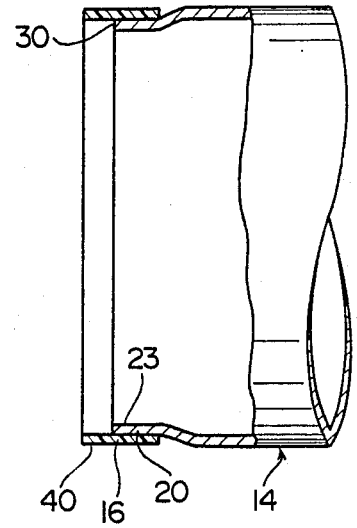
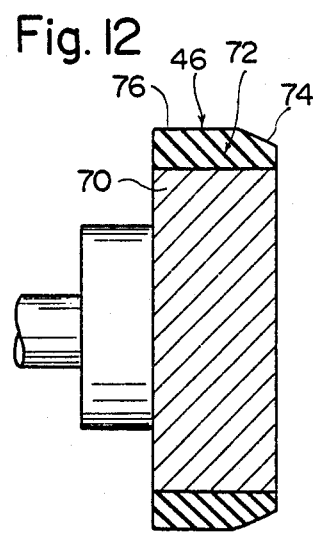
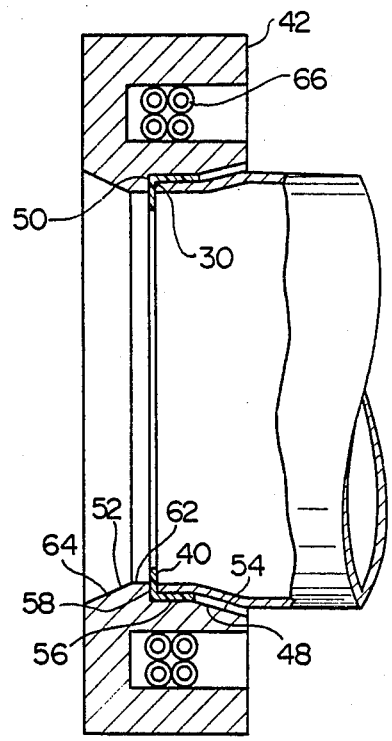

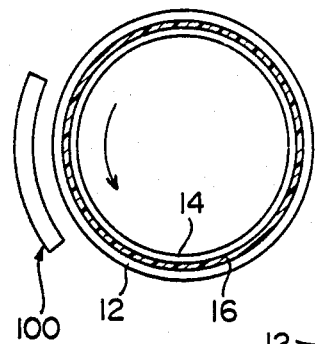
Fig. 18
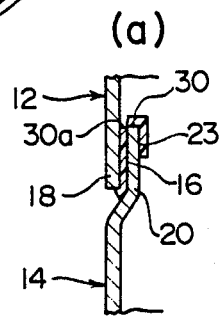
Fig. 19
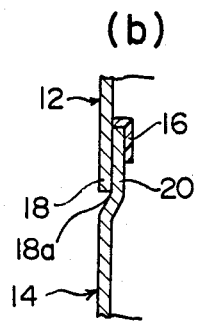
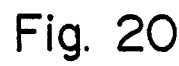
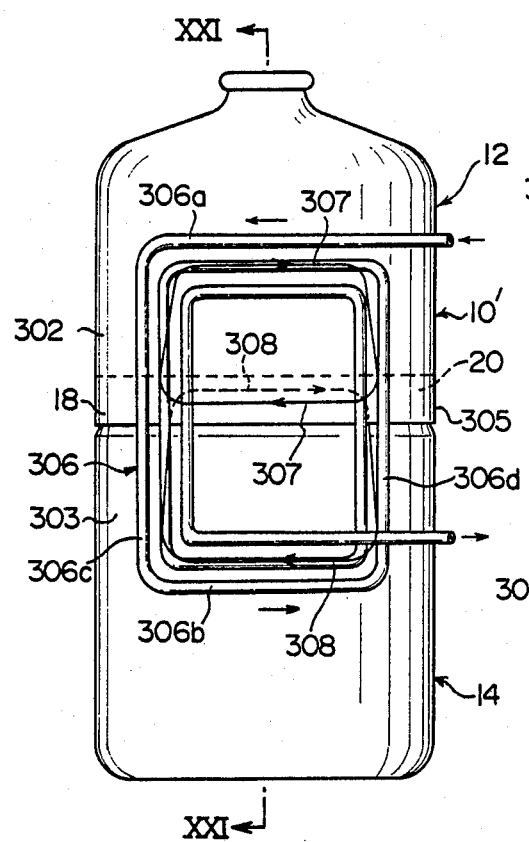
Fig. 20
Fig. 21

METALLIC CONTAINER HAVING A CIRCUMFERENTIAL BONDED PORTION AND PROCESS FOR PRODUCTION THEREOF

This application is a continuation, of now abandoned application Ser. No. 550,622, filed Nov. 10, 1983 now abandoned.

BACKGROUND OF THE INVENTION

1. Field of the Invention

This invention relates to a metallic container having a circumferential bonded portion and a process for its production. More specifically, this invention relates to a metallic container composed of a first and a second section each composed of a metallic cup-like fabricated article having a primer coating, the two sections being lap-bonded at their circumferential open end portions by means of a thermoplastic film-like adhesive, and to a process for producing said metallic container.

2. Description of the Prior Art

Japanese Laid-Open Patent Publications Nos. 49611/1979, 32228/1981 and 38294/1980 disclose that metallic containers having a circumferential bonded portion produced by bonding two metallic cup-like fabricated articles having nearly equal diameters and a relatively small thickness with an adhesive are suitable for use as pressure cans for beer and carbonated beverages.

The two metallic cup-like fabricated articles constituting the metallic containers are produced usually by drawing a metallic blank having a corrosion-resistant coating on that surface which is to become the inner surfaces of these cup-like shaped articles. Hence, the inside surfaces of these metallic cup-like shaped articles are protected by the corrosion-resistant coating, but the metal substrate is exposed at the end surfaces at the open end portions formed by cutting. To secure corrosion resistance of the metallic container against the contents, therefore, it is desirable to coat particularly the end surface of the open end portion of the inside of the cup-like fabricated article and its inner circumferential surface near the end surface with an adhesive layer.

The adhesive layer may be formed, for example, by the coating of a thermosetting adhesive or a slurry-type adhesive disclosed, for example, in Japanese Laid-Open Patent Publication No. 153629/1980, or electrostatic coating of a powdery adhesive. In order to easily obtain an adhesive layer having a uniform thickness and being free from defects such as the occurrence of pores, it is preferred to use a thermoplastic film-like adhesive and apply it so as to envelop the end surface having the exposed metal substrate.

To secure corrosion resistance, considered, it is very important for the film-like adhesive to completely cover the end surface having the exposed metal substrate. If even a part of the metal substrate is exposed, the metal will dissolve from this part into the contents of the metallic container and extremely damage the taste and flavor of the contents. Furthermore, metal corrosion tends to spread beneath the protective coating starting at the exposed part. Hence, the adhesion of the protective coating is reduced, and the strength of the bonded portion becomes extremly weak. When corrosion is heavy, leakage from that part occurs or holes form in the container.

SUMMARY OF THE INVENTION

It is a principal object of this invention to provide a metallic container having excellent corrosion resistance and a process for its production.

Another object of this invention is to provide a metallic container having a circumferential bonded portion in which a film-like adhesive is adhered appropriately to the open end portions of metallic cup-like fabricated articles whereby the sealability and bond strength of the container are markedly improved, and a process for its production.

Still another object of this invention is to provide a process by which the open end portion of a metallic cup-like fabricated article can be conveniently heated to the desired temperature and a film-like adhesive can be adhered properly to the heated open end portion.

In relation to the aforesaid objects, the present invention provides a process for producing a metallic container by lap-bonding a first and a second section each composed of a primer-coated metallic cup-like fabricated article at their circumferential open end portions by means of a thermoplastic film-like adhesive, which comprises a fabricating step of producing the first and second sections so that the inside diameter of the open end portion of the first section becomes nearly equal to the outside diameter of the open end portion of the second section;

an adhering step of substantially uniformly pre-heating the open end portion of the second section to a temperature near the lower limit of temperatures at which the film-like adhesive can be adhered, locally heating the open end portion of the second section upstream of the site of heat-adhering in the circumferential direction, while the second section is being rotated, so that the open end portion of the second section at the site of heat-adhering attains said temperatures at which the film-like adhesive can be adhered, and heat-adhering the film-like adhesive to the peripherfal surface of the open end portion of the second section at said site of heat-adhering; and a bonding step of fitting the open end portions of the first and second sections and bonding them.

Still another object of this invention is to provide a process for producing a metallic container having a circumferential bonded portion in which in the bonding step, the fitted portion can be suitably heated and simultaneously, the unacceptability of the fitted portion can be detected.

In relation to the above object, the present invention provides a process for producing a metallic container having a circumferential bonded portion by lap-bonding a first and a second section each composed of a primer-coated metallic cup-like fabricated article at their circumferential open end portions by means of a thermoplastic film-like adhesive, which comprises a fabricating step of producing the first and second sections so that the inside diameter of the open end portion of the first section becomes nearly equal to the outside diameter of the open end portion of the second section;

an adhering step of heating the open end portion of the second section to a temperature at which the film like adhesive can be melted and adhered, and adhering the filmlike adhesive to the peripheral surface of the open end portion of the second section; and a bonding step of fitting the open end portions of the first and second setions with the film-like adhesive to form a fitted portion, placing a high frequency induction heating coil near the fitted first and second sections so that an induced current is generated locally along the circumferential direction of the fitted portion and the direction of the induced current flowing in the first section area of the fitted portion is opposite to that of the induced current flowing in the second section area of the fitted portion, passing an electric current through the heating coil while moving the fitted portion and the heating coil relative to each other thereby to bond the two sections under heat along the entire length of the fitted portion, and detecting the temperature of the fitted portion along its entire length during or immediately after heat-bonding.

Yet another object of this invention is to provide a process for producing a metallic container with good efficiency by properly and efficiently heating the open end portions of metallic cup-like fabricated articles to the desired temperature.

In relation to the above object, the present invention provides a process for producing a metallic container by lap-bonding a first and a second section each composed of a primer-coated metallic cup-like fabricated article at their circumferential open end portions by means of a thermoplastic film-like adhesive, which comprises positioning the open end portions of the first and second sections in proximity to a high frequency induction heating coil set on a rotating supporting stand and adapted to receive high frequency power from a fixed coil, and while rotating the open end portions with respect to the high frequency induction heating coil, heating the entire circumferences of the open end portions by high frequency induction heating.

A further object of this invention is to provide a process for producing a metallic container having excellent corrosion resistance wherein a film-like adhesive properly envelops the edges of the open end portions of metallic cup-like fabricated articles at which the metal substrate is exposed.

In relation to the above object, the present invention provides a process for producing a metallic container by lap-bonding a first and a second section each composed of a primer-coated metallic cup-like fabricated article at their circumferential open end portions by means of a thermoplastic film-like adhesive, which comprises a fabricating step of producing the first and second sections so that the inside diameter of the open end portion of the first section becomes nearly equal to the outside diameter of the open end portion of the second section;

an adhering step of heating the open end portion of the second section to a temperature at which the film-like adhesive can be melted and adhered, and continuously pressing the film-like adhesive against the periphery of the open end portion of the second section thereby to adhere the film-like adhesive to the periphery of the open end portion of the second section such that a part of the film-like adhesive protrudes from the open end portion of the second section;

a folding step of inwardly folding the entire circumference of that part of the film-like adhesive which protrudes from the open end portion of the second section, so as to envelop the edge of the open end portion of the second section and its inner circumferential surface following said end edge, uniformly pressing the entire circumference of the open end portion of the second section through the film-like adhesive radially from inside to outside, and heating the entire circumference of the open end portion of the second section in the pressed state to a temperature at which the film-like adhesive can be melted and adhered, thereby to adhere the film-like adhesive to the inner circumferential surface of the open end portion of the second section; and a bonding step of changing the diameter of the open end portion of at least one of the first and second sections uniformly and nearly concentrically, fitting the open end portions of the first and second sections, then heating the open end portions of the first and second sections to a temperature at which the film-like adhesive can be melted and adhered, while exerting a mutual pressure thereon, and thereafter cooling the open end portions thereby to bond the first and second sections.

An additional object of this invention is to provide a metallic container having a circumferential bonded portion wherein the circumferential end portions of a film-like adhesive adhered to the open end portions of metallic cup-like fabricated articles are properly connected thereby to impart improved corrosion resistance and sealability, and a process for producing such a metallic container.

In relation to the above object, the present invention provides a process for producing a metallic container by lap-bonding a first and a second section each composed of a primer-coated metallic cup-like fabricated article at their circumferential open end portions by means of a thermoplastic film-like adhesive, which comprises a fabricating step of producing the first and second sections so that the inside diameter of the open end portion of the first section becomes nearly equal to the outside diameter of the open end portion of the second section;

an adhering step of heating the open end portion of the second section to a temperature at which the film-like adhesive can be melted and adhered, and continuously pressing the film-like adhesive against the periphery of the open end portion of the second section thereby to adhere the film-like adhesive to the periphery of the open end portion of the second section such that a part of the film-like adhesive protrudes from the open end portion of the second section and the film-like adhesive has an over-lapping portion in the circumferential direction;

a folding step of inwardly folding the entire circumference of that part of the film-like adhesive which protrudes from the open end portion of the second section, so as to envelop the edge of the open end portion of the second section and its inner circumferential surface following said end edge, uniformly pressing the entire circumference of the open end portion of the second section through the film-like adhesive radially from inside to outside, and heating the entire circumference of the open end portion of the second section in the pressed state to a temperature at which the film-like adhesive can be melted and adhered, thereby to adhere the film-like adhesive to the inner circumferential surface of the open end portion of the second section; and a bonding step of changing the diameter of the open end portion of at least one of the first and second sections uniformly and nearly concentrically, fitting the open end portions of the first and second sections, then heating the open end portions of the first and second sections to a temperature at which the film-like adhesive can be melted and adhered, while exerting a mutual pressure thereon, and thereafter cooling the open end portions thereby to bond the first and second sections.

According to this invention, there is also provided a metallic bonded container consisting of a first and a second section each composed of a metallic cup-like fabricated article, the first and second sections being lap-bonded through a film-like adhesive at their circumferential open end portions, said film-like adhesive being adhered to the edge of the open end portion of the second section and its inner circumferential surface following said end edge while the adhesive has an overlapping portion in the circumferential direction.

BRIEF DESCRIPTION OF THE DRAWINGS

FIG. 1 is a vertical sectional view of a metallic container having a circumferential bonded portion according to a preferred embodiment of this invention;

FIG. 2 is a vertical sectional view of the principal parts of an apparatus which can be used in a first embodiment of the adhering step of the process of this invention;

FIG. 10 is a simplified view showing one example of a lower member to which a film-like adhesive is adhered by the adhering step of the process of this invention;

FIG. 11 is a partial sectional view showing the open end portion of a lower member of the metallic container, a film-like adhesive and a die in the folding step of the process of this invention;

FIG. 12 is a partial sectional view of a mandrel used in the folding step of the process of this invention;

FIG. 13 is a simplified view showing the fitted state of the aforesaid die and mandrel;

FIGS. 17 and 18 are simplified views showing one embodiment of the bonding step;

FIGS. 19(a), 19(b) and 19(c) are enlarged vertical sectional views of principal parts showing examples of defects in the bonded portion of the container of FIG. 1;

FIG. 20 is a front elevation showing the heating of the fitted portion of a metallic container by high frequency induction heating to practice another embodiment of the bonding step of the process of this invention;

FIG. 21 is a vertical sectional view taken along line XXI—XXI of FIG. 20;

DETAILED DESCRIPTION OF THE INVENTION

Figure 3A:
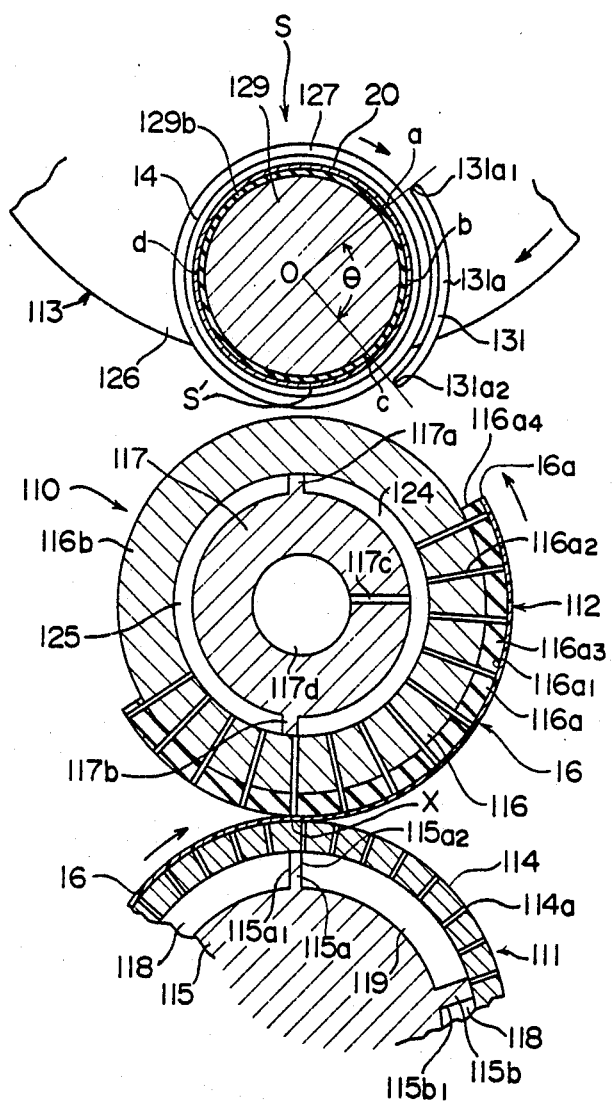
FIGS. 3(a) to 3(c) are vertical sectional views taken along line III—III of FIG. 2, FIG. 3(a) showing the state of a film-like adhesive beforeit reaches the site of heat-adhering, FIG. 3(b) showing the state of the adhesive upon arrival at the site of heat-adhering, and FIG. 3(c) showing the state of the adhesive during heat-adhering.

According to a preferred embodiment of the process of this invention, a metallic container having a circumferential bonded portion is produced by a fabricating step, an adhering step, a folding step and a bonding step.

FIG. 1 shows a metallic container 10 having a circumferential bonded portion which is produced in accordance with a preferred embodiment of the process of this invention. The metallic container 10 consists of a first section 12 as an upper member and a second section 14 as a lower member which are bonded to each other through a film-like adhesive 16.

The individual steps of producing the metallic container 10 are described below in detail.

Fabricating step

In FIG. 1, the upper member 12 and the lower member 14 of the metallic container 10 are produced in a cup-like shape by, for example, drawing or ironing various blanks, for example, a light metallic plate such as an aluminum plate, a non-treated steel plate (black plate), and various surface-treated steel plates such as plated steel plates (e.g., a tin plated steel plate, a zinc plated steel plate, an aluminumm plated steel plate or a chromium-plated steel plate), electrolytically treated steel plates such as a steel plate electrolytically treated with chromic acid, and chemically treated steel plates such as steel plates treated with phosphoric acid and/or chromic acid, into a cup shape.

The thickness of the metal blank to be fabricated differs depending upon its type or the final size of the coontainer. Generally, it is desirablle to adjust its thickness to 0.1 to 0.5 mm, especially 0.2 to 0.35 mm. On the other hand, when ironing is to be carried out the thickness of the side wall portion of the resulting fabricated article is preferably 0.05 to 0.3 mm, espcially 0.06 to 0.20 mm. The shapes of the upper member 12 and the lower member 14 shown in FIG. 1 are one example. If desired, for example, it is possible to increase the height of the lower member 14, and decrease the height of the upper member and form it in a flattened shape.

The inside diameter $D_1$ of the open end portion 18 of the upper member 12 is made nearly equal to the outside diameter $D_2$ of the open end portion 20 of the lower member 14. Let the thickness of the film-like adhesive 16 be t, then the interference s is given by the following equation.

$$s = (D_2 + 2t) - D_1$$

The mutual pressure acting on the fitted part of the open end portions 18 and 20 is proportional to the interference s. Accordingly, the inside diameter $D_1$, the outside diameter $D_2$ and the thickness t are selected so that a suitable mutual pressure will be exerted on the fitted part.

Preferably, an anti-corrosive film having excellent adhesion to the film-like adhesive 16 under heat is formed on the inner surfaces of the upper member 12 and the lower member 14. If required, a primer layer having good adhesion to the film-like adhesive 16 is formed on the outside surfaces of these members particularly on the peripheral surface of the open end portion 20 of the lower member 14.

Paints based on various thermosetting or thermoplastic resins can be used to form the protective layer and the primer layer. Examples include modified epoxy paints such as phenol-epoxy and amino epoxy paints; vinyl or modified vinyl paints such as those obtained from a vinyl chloride/vinyl acetate copolymer, a partially saponified vinyl chloride/vinyl copolymer, a vinyl chloride/vinyl acetate/maleic anhydride copolymer, and an epoxy-modified, epoxyamino-modified or epoxyphenol-modified vinyl resin; acrylic resin paints; and paints of the synthetic rubber type such as a styrene/butadiene copolymer paint.

Adhering step

In the adhering step, the film-like adhesive 16 is adhered to the upper open end portion 20 of the lower member 14. Specifically, the film-like adhesive 16 is adhered to the periphery of the open end portion 20 of the lower member 14 fabricated as above. The film-like adhesive 16 may be a cut portion of a tape, or may be a film formed from a resin extruded by an extruder. The thickness of the film-like adhesive 16 is preferably 0.01 to 0.3 mm, especially preferably 0.02 to 0.15 mm. The length of the film-like adhesive 16 is larger than the circumferential length of the open end portion 20 of the lower member 14, and therefore, when the film-like adhesive 16 is applied to the open end portion 20, it partly overlaps. The film-like adhesive 16 is adhered to the open end portion 20 so that it forms a protruding portion in its widthwise direction (the vertical direction in FIG. 1). In other words, the lower part of the film-like adhesive in its widthwise direction is adhered to the open end portion 20, but its upper portion extends beyond the upper end edge 30 of the open end portion 20 to form the protruding portion.

To adhere the heat-adhesive film-like adhesive properly to the open end portion 20, the adherend should be heated to a temperature in the range of from $T_x$ to $T_y$ at which the adhesive 16 can be adhered (this temperature is sometimes referred to in this application simply as the "heat-adherable temperature"). If the temperature of the adherend is below the lower limit specified, troubles such as peeling of the films or poor folding of the film occur in the folding step. If the temperature is above the upper limit specified, foaming or decomposition tends to occur in the primer layer or the film-like adhesive.

The film-like adhesive is composed of a film-forming thermoplastic resin. In order to secure good adhesion to the metallic portion of the end edge 30 and to the inside primer layer, the film-forming thermoplastic resin desirably has some amount of polar groups in the main chain or side chains. From this standpoint, it is desired to use as a main component a thermoplastic polymer having a carbonyl group

based on a carboxylic acid, a carboxylic acid salt, a carboxylic acid anhydride, a carboxylic acid ester, a carboxylic acid amide, a ketone, a carbonic acid ester, urea, urethan, etc. Examples of resins which can be used as materials for the film-like adhesive in this invention are polyesters, polyamides, ionomers, acid-modified polyolefins, and polycarbonates in the decreasing order of importance.

These resins should have a molecular weight at least sufficient for film formation. If desired, these resins may be blended with known additives such as ultraviolet absorbers, stabilizers, lubricants, antioxidants, fillers, pigments, dyes and antistatic agents in accordance with known recipes.

Accordingly, the lower limit $T_x$ of the temperature range ($T_x$ to $T_y$) at which the film-like adhesive 16 can be adhered can be set at a melt-adhering start temperature (i.e., about 100° to about 240° C.) which differs depending upon the material for the film-like adhesive.

The upper limit $T_y$ of the above temperature range of $T_x$ to $T_y$ can be set at a maximum temperature at which forming, oxidation, decomposition, etc. do not occur in the primer layer or the film-like adhesive, for example 300° C. If foaming, oxidation, decomosition, etc. occur in the primer layer or the film-like adhesive, a proper bonding strength cannot be obtained, or leakage occurs.

Now, with reference to FIGS. 2 to 4, a first embodiment of the adhering step will be described.

Figure 3B:
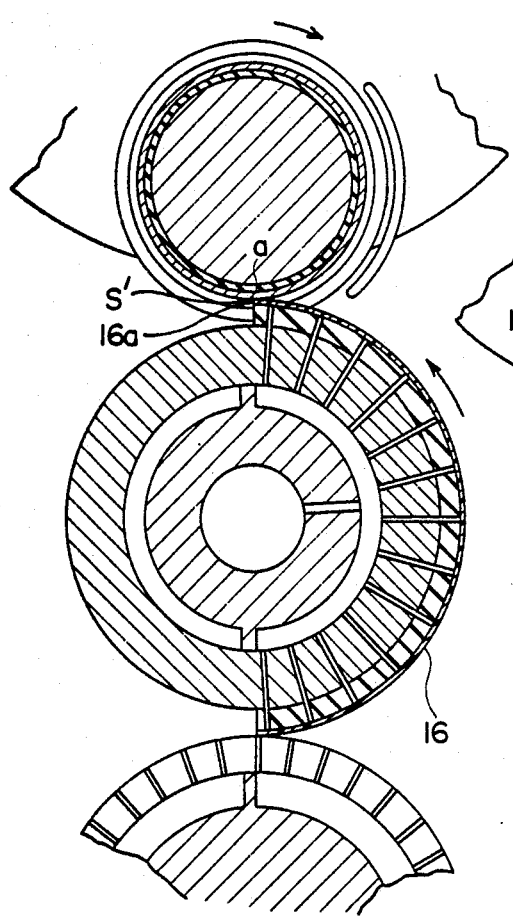
Figure 3C:
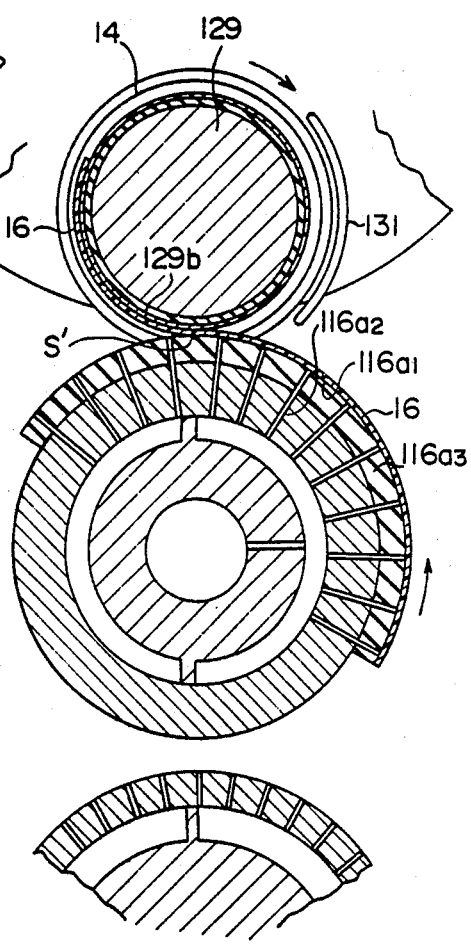

FIGS. 2 and 3 show principal parts of an example of a heat adhering apparatus 110 for the film-like adhesive 16. The heat-adhering apparatus 110 includes a roll device 111 for supplying an adhesive tape (i.e., film-like adhesive), an adhering roll device 112 and a conveying device 113 for conveying the lower member 14. The adhesive supply roll device 111 is comprised of a hollow roll (made, for example, of a metal such as aluminum) and a fixed cylinder 115 (FIG. 3) provided in the hollow portion of the roll 114. The structures of the roll 114 and the fixed cylinder 115 are nearly the same as those of an adhering roll 116 and a fixed cylinder 117 of the adhering roll device 112 to be described below except the difference in shape. The roll 114 has formed therein a plurality of vacuum sucking holes 114a extending radially along its entire circumference. The tape (not shown) supplied to a groove 114b on the circumferential surface of the roll 114 by a pinch roll (not shown) is attracted to, and wrapped about, the circumferential surface of the roll 114 by a negative pressure.

A vacuum chamber 118 and an air chamber 119 are formed between the inside surface of the roll 114 and the outside surface of the fixed cylinder 15 and which spaced from each other by a first protruding portion 115a and a second protruding portion 115b. The circumferential surfaces of the protruding portions 115a and 115b are airtight and slidable with respect to the inner circumferential surface of the roll 114. The first protruding portion 115a is formed at a position opposite to the adhering roll device 112 such that its surface $115a_1$ on the side of the vacuum chamber 118 is in proximity to a phantom plane passing through the axes of the roll 114 and the adhering roll 116 and its surface $115a_2$ on the side of the air chamber 119 is also in proximity to the above phantom plane. This structure permits smooth movement of the film-like adhesive 16 from the roll 114 to the adhering roll 116.

The second protruding portion 115b is formed at a position opposite to the pinch roll (not shown) with its surface $115b_1$ located on the air chamber (119) side of a phantom plane passing through the axes of the roll 114 and the pinch roll. Thus, when the film like adhesive passes between the pinch roll and the roll 114, it is immediately attracted onto the groove 114b by vacuum.

The adhesive tape (not shown) is delivered from a delivery reel (not shown), travels via a looper (not shown) and is wrapped by vacuum attraction about the hollow roll 114 of the tape supply roll device 111. The roll 114 is constructed such that it rotates intermittently in the direction of the arrow at a fixed circumferential speed by a driving mechanism (not shown). During stoppage of the roll 114, the tape is cut by a cutter (not shown) to a fixed length (substantially equal to the sum of the circumferential length l of the open end portion 20 and the length m of the overlapping portion, i.e. l+m) to form the film-like adhesive 16.

As shown in FIG. 2, the fixed cylinder 117 of the adhering roll device 112 is provided at the end portion of a hollow fixed shaft 121. The adhering roll 116 slides air-tight along the bushing part of the fixed cylinder 117 and is rotated continuously by a motor 122 through a gear device 123 in the direction of the arrow (FIG. 3) so that the circumferential speed of the heat-adhering surface $116a_1$ is kept at a predetermined value v. A vacuum chamber 124 and an air chamber 125 are formed in the space between the inside surface of the adhering roll 116 and the outside surface of the fixed cylinder 117 by a first protruding portion 117a and a second protruding portion 117b. The vacuum chamber 124 communicates with a vacuum device (not shown) through a conduit 117c and a central bore 117d (extending through the hollow fixed shaft 121) provided in the fixed cylinder 117.

The adhering roll 116 includes a heat-adhering portion 116a having a heat-adhering surface $116a_1$ with a circumferential length substantially equal to the length of the film-like adhesive 16 in the form of a tape and a small-diameter portion having a smaller radius than the heat-adhering portion 116a. As shown in FIG. 2, the heat-adhering surface $116a_1$ is formed of a heat-resistant elastic rubber (such as a silicone rubber) layer $116a_3$ having a width nearly equal to the width of the film-like adhesive 16 and a larger height than the depth of the groove 114b of the roll 114. A plurality of vacuum sucking holes $116a_2$ extending radially and communicating with the vacuum chamber 124 are formed in the heat-adhering portion 116a.

The conveying device 113 includes a rotating disc 126 and a holder 127. The holder 127 is comprised of a holder body 127a having formed therein a depressed portion $127a_1$ of a shape capable of accomodating that part of the lower member 14 which is near the bottom portion thereof, and a shaft 127b fixed to the holder body 127a coaxially with the lower member 14 received by the holder 127. A plurality of (for example, four) such holders 127 are provided at equal intervals along the circumferential direction of the rotating disc 126, and the shaft 127b is supported so that it can slide axially in an opening formed in the rotating disc 126. A rotating plate 128 is provided coaxially with the rotating disc 126 at a position opposite to the rotating disc 126. A plurality of (for example, 4) mandrels 129 are rotatably supported on the rotating plate 128 at positions facing the holders 127. A relatively thin (usually with a thickness of 1 to 10 mm) heat-resistant heat insulating layer 129b (for example, made of Teflon, bakelite, ceramics) is provided at the peripheral portion of the mandrel 129 so that the heat-insulating layer 129b envelops the core portion 129a (made of a metal such as aluminum) of the mandrel 129. The heat-insulating layer 129b reduces the cooling of the open end portion 20 which may occur owing to escaping of the heat of the heated open end portion 20 into the core portion 129a.

The core portion 129a has formed therein a protruding portion $129a_1$ to be engaged with the end surface 30 of the open end portion 20 so that the position of the lower member 14 in the axial direction is set.

A motor (not shown) is provided for each holder 127. The holder 127 and the mandrel 129 which cooperatively hold the lower member 14 is synchronously rotated by the motor through a gear (not shown) and a gear 130 respectively so that the circumferential speed of the open end portion 20 is set at v.

For each mandrel 129, a high frequency induction heating coil (to be referred to hereinbelow as a heating coil) 131 whose arcuate portion 131a faces the open end portion 20 is fixed to the rotating plate 128 by a supporting member (not shown) to heat the open end portion 20. The heating coil 131 is connected to a high frequency oscillator via a feeder and a rotating transformer (not shown). A charging station (not shown), a heat-adhering station S and a delivery station (not shown) are provided along the conveying device 113.

The rotating disc 126 and the rotating plate 128 are adapted to make an intermittent rotating movement in the direction of the arrow [(FIG. 3(a)] by a driving mechanism (not shown) at such a speed that when the holder 127 has reached each station, they stop for a predetermined period of time (the time during which the adhesive is heat-adhered to the lower member 14, or in other words the time during which the heat-adhering surface $116a_1$ of the heat-adhering roll device 112 is passing the heat-adhering site S'), rotate during the time when the small diameter portion 116b is passing a site corresponding to the heat-adhering site S', and the moment the above passage is over, the next lower member 14 reaches the heat-adhering station S. The mandrel 129 is provided such that at the heat-adhering site S', the heat-adhering surface $116a_1$ faces the open end portion 20, and the space between them is slightly smaller than the thickness of the film-like adhesive 16 (in order to exert a pressing force at the time of heat adhering).

In the apparatus 110 described hereinabove, the tape is of a predetermined width and thicknesss and can be formed of a heat-adhesive resin, for example a film of a thermoplastic polymer having a relatively low melting point and containing a polar group, such as modified linear polyesters, nylon 12, nylon 11 and acid-modified polyolefins. The tape is charged into the groove 114b of the supply roll device 111 and wrapped about the bottom surface of the groove 114b by vacuum attraction, advances in the direction of the arrow with the rotation of the roll 114. At a predetermined position, the roll 114 stops and the tape is cut to form the film-like adhesive 16. This stopping of the roll 114 lasts until the small diameter portion 16b of the adhering roll 116 rotating continuously in the direction of an arrow has passed the site X of the roll 114 which is opposite to the adhering roll 116. When the end $116a_4$ of the heat adhering portion 116a of the adhering roll 116 has reached the site X, the roll 114 rotates in the direction of the arrow at the same circumferential speed v, and the vacuum attracting holes 114a for attracting the end portion of the film-like adhesive 16 on the roll 114 communicate with the air chamber 119 to relieve the vacuum. Accordingly, the end portion of the film-like adhesive 16 is attracted by the vacuum attracting holes $116a_2$ of the heat-adhering portion 116a and is smoothly transferred from the roll 114 to the heat-adhering surface $116a_1$. This transfer continues until the trailing end of the film-like adhesive 16 reaches the opposite position X, and upon arrival at the position X, the roll 114 stops.

The attraction of the film-like adhesive 16 by the vacuum attracting holes 116a is relieved at the heat-adhering site S', and the adhesive 16 leaves the heat-adhering surface $116a_1$ and rotates at the circumferential speed v in the direction of the arrow and is heat-adhered under pressure by the cooperative action of the heat-resistant elastic rubber layer $116a_3$ and the heat insulating layer 129b of the mandrel 129 to the entire circumferential surface of the open end portion 20 of the lower member 14 heated by the heating coil 131 to a heat-adherable temperature. The lower member 14 is delivered from the delivery station, and the outwardly protruding portion 40 of the open end portion 20 of the film-like adhesive 16 is folded inwardly in the next step to protect the end surface 30 of the lower member 14. As a result, the lower member 14 shown in FIG. 1 is formed in which the protruding portion 40 is heat-adhered to the inner circumferential surface of the open end portion 20.

Since the heat-adhering site S' exists, the heating coil 131 cannot be provided so as to surround the entire circumference of the open end portion 20. To avoid contact with at least the heat-adhering portion 116a of the adhering roll 116, the heating coil 131 must be provided such that its portion 131a (FIG. 2) locally faces the open end portion 20 in proximity thereto. Even when the open end portion 20 is heated to the heat-adherable temperature by energizing the heating coil 131 before the lower member 14 reaches the heat-adhering station S, the open end portion 20 is deprived of heat upon deenergizing of the heating coil 131 and is abruptly cooled. It is therefore to energize the heating coil 131 and heat the open end portion 20 even during the adhering of the film-like adhesive 16 to the open end portion 20. The heating during the heat-adhering of the film-like adhesive tape is called "simultaneous heating" in the present specification.

In order to minimize cooling of the open end portion 20 heated by the simultaneous heating operation before it reaches the heat-adhering site S', it is desirable to provide the heating coil 131 upstream of the heat-adhering site S' and as close as possible to the heat-adhering site S' within the range where it does not contact the adhering roll 116 when the lower member 14 is positioned at the heat-adhering station S.

The central angle $\theta$ of the arcuate portion 131a of the heating coil 131 which opposes the open end portion 20 to the lower member 14, and therefore to the mandrel 129 [FIG. 3(a)], is preferably about 40 to about 180 degrees, especially preferably about 90 to about 110 degrees. If it is smaller than about 40 degrees, the electromagnetic coupling with the lower member 14 is reduced to decrease the heating efficiency. On the other hand, when the central angle exeeds about 180 degrees, the electromagnetic coupling becomes greater, but an induced current circulating in the circumferential direction is generated to reduce the heating efficiency. Moreover, as will be described below, that part of the open end portion 20 which has a non-uniform heating temperature increases.

That part of the open end portion 20 in the state shown in FIG. 3(a) which corresponds to the upper end portion $131a_1$ of the arcuate portion 131a of the heating coil is designated as a; that part of the open end portion 20 which corresponds to the lower end portion $131a_2$ of the arcuate portion 131a, as c; an intermediate part between parts a and c, as b; and a part which is opposite to the part b with respect to the center o, as d. Furthermore, it is assumed that the circumferential length between the part a and the heat-adhering site S' is equal to the circumferential length between the leading end 16a of the film-like adhesive 16 on the adhering roll 116 and the heat-adhering site S'. In other words, as shown in FIG. 3(b), after the passage of a certain period of time, the part a contacts the leading end 16a of the film-like adhesive 16 at the heat-adhering site S'.

Now, let us assume that in the state shown in FIG. 3(a) (time $t_1$), the open end portion 20 is uniformly heated at temperature $T_2$ along the circumferential direction, and at this time, the rotation of the open end portion 20 in the direction of an arrow and the energization of the heating coil 131 have started. The temperatures of the parts of the open end portion 20 at the heat-adhering site S' until the end of adhering of the film-like adhesive 16 are shown by the curve of FIG. 4 shown by a solid line.

The part c arrives at the heat-adhering site S' at time $t_2$, but before that time, its temperature somewhat decreases to $T_1$ (a decrease of about 10° C., for example). The part which ranges from part c to part a via part b is heated by the heating coil 131, and the rise of the temperature of this part is greater as it comes nearer part a. When the part a has reached the heat-adhering site S' (at time $t_3$), its temperature becomes $T_3$. The rise of the temperature of that part which ranges from part a to part c via part d is equal to that of part a, and the temperature of this part at the heat-adhering site S' is $T_3$. At times $t_4$ and $t_5$, parts c and a again reach the heat-adhering site S'. The temperature of part a at this time becomes $T_4$ which is higher than the temperature ($T_3$) of part c. The period ranging from time $t_3$ to time $t_5$ is the time when the heat-adhering of the film-like adhesive is carried out. As the circumferential length of the part a-b-c, i.e. the central angle $\theta$, is greater, the non-uniformly heated part of the open end portion 20 increases.

The temperature of the open end portion 20 at the heat-adhering site S' during the adhering of the film-like adhesive (from time $t_3$ to time $t_5$) should be within the range of temperatures at which the film-like adhesive can be heat-adhered (adherable temperature). The lower limit $T_x$ of the heat-adherable temperature is determined by the minimum temperature at which the required heat adhesion strength can be obtained. When the film-like adhesive 16 is formed from a crystalline thermoplastic polymer, this lower limit is usually a temperature 5° to 10° C. higher than its melting point (defined by a fusion peak value observed by differential scanning calorimetry). When the film-like adhesive is formed from an amorphous polymer, it is about 5° C. higher than its second-order transition temperature Tg. The upper limit $T_y$ is a maximum temperature at which extreme foaming, heat degradation and heat decomposition of the film-like adhesive 16 or the primer coating do not occur. It is usually about 300° C., preferably about 260° to 280° C.

Figure 4:
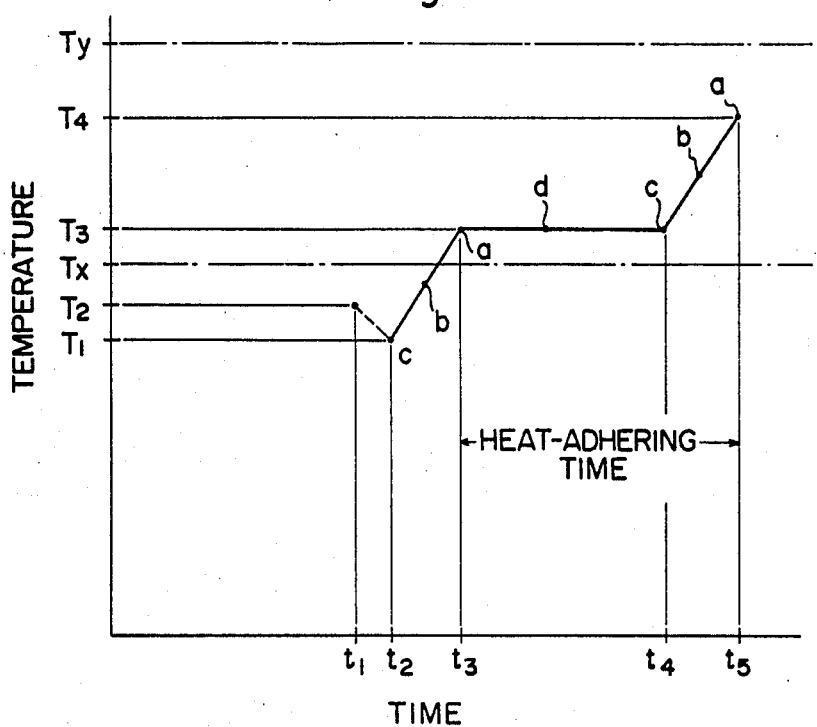
FIG. 4 is a diagram showing one example of a temperature-time curve obtained during heating in the apparatus shown in FIG. 2.

Accordingly, as shown in FIG. 4, the relations $T_4 < T_y$ and $T_3 > T_x$ should be satisfied. Furthermore, the central angle $\theta$, the peripheral speed v of the open end portion 20, the output of the heating coil 131, etc. should be determined so that $\Delta T < T_y - T_x$ where $\Delta T = T_4 - T_3 = T_3 - T_1$. In order that the temperatures $T_3$ and $T_4$ be within the range of the heat-adherable temperatures, namely between $T_x$ and $T_y$, the temperature $T_1$ of part c upon its arrival at the heat-adhering site S' should satisfy the following relations.

$T_1 + \Delta T > T_x$, namely $T_1 > T_x - \Delta T$, $T_1 + 2\Delta T < T_y$, namely $T_1 T_y - 2\Delta T$.

If we assume $T_2 \doteq T_1$ by disregarding the temperature fall (usually about 5° to 15° C.) during the time required for part c to reach the heat-adhering site S' from the position shown in FIG. 3-(a), the following relations are established.

$T_2 > T_x - \Delta T$       (1)

$T_2 < T_y - 2\Delta T$       (2)

Thus, at the time when the open end portion 20 has arrived at the heat-adhering station S, the open end portion 20 should already be in the state of having been substantially uniformly pre-heated along its circumferential direction to a temperature near the lower limit $T_x$ of the heat-adherable temperature which satisfies equations (1) and (2).

The range between the upper limit ($T_y$) and the lower limit ($T_x$) of the heat-adherable temperatures is relatively narrow, and at the time of simultaneous heating, a temperature change of T occurs along the open end portion 20. Hence, unless the pre-heating is carried out substantially uniformly, it is likely that a part having a temperature exceeding the upper limit ($T_y$) or which is below the lower limit ($T_x$) will occur along the open end portion 20 at the time of heat-adhering.

The aforesaid substantially uniform heating can be achieved by rotating the open end portion 20 a plurality of times (for example 4 to 30 times) and simultaneously energizing the heating coil 131 so as to produce a relatively high output before the open end portion 20 reaches the heat-adhering station S from the charging station. The output during the simultaneous heating is usually set at a value lower than in the pre-heating in order that the T does not become excessively large. Upon termination of the heat-adhering, i.e. at time $t_5$, the heating coil 131 is deenergized. This is for the purpose of preventing overheating of the heat-adhered film-like adhesive.

Another method of heating the open end portion 20 substantially uniformly comprises providing the heating coil 131 and a ring-like heating coil surrounding the entire circumference of the open end portion 20 side by side in the axial direction of the lower member, and until the open end portion 20 reaches the heat-adhering station S from the charging station, passing an electric current through the ring-like heating coil while keeping it face to face with the open end portion 20. At this time, immediately before the open end portion 20 reaches the heat-adhering station S, the lower member is moved axially so that the heating coil 131 faces the open end portion 20. Immediately then, the lower member is rotated, and an electric current is passed through the heating coil 131 to perform simultaneous heating. When the heat-adhering is over, the heating coil 131 is deenergized.

It should be understood that the first embodiment of the adhering step is not to be limited by the specific disclosure given hereinabove, and various changes and modifications are possible. For example, the open end portion need not always to be reduced in diameter. The lower and upper members may be of any desired shape. Or the pre-heating and/or simultaneous heating may be carried out by such heating means as infrared ray irradiation or blowing of hot air.

Since according to this embodiment, the film-like thermoplastic polymeric adhesive can be heat-adhered to the open end portion heated at the heat-adherable temperature of the lower member, various defects such as foaming of the heat-adhered adhesive or the heat degradation or heat decomposition of the primer coating, or the reduced adhesion strength can be circumvented.

Now, a second embodiment of the adhering step will be described in detail with reference to FIGS. 5 to 9.

Figure 5:
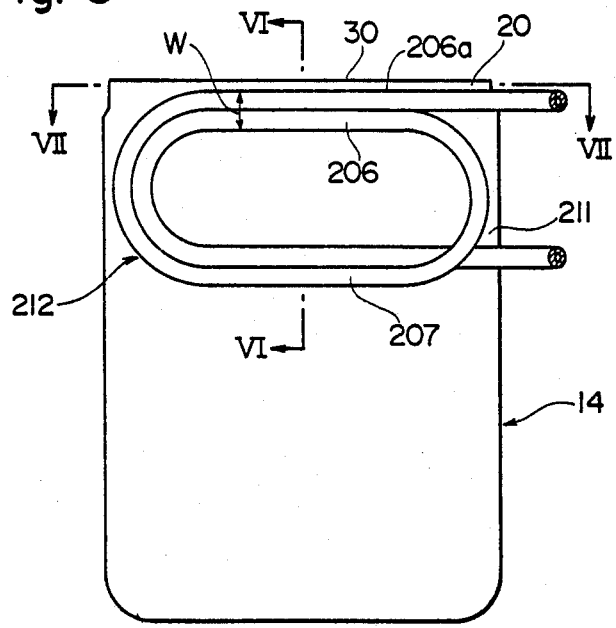
FIG. 5 is a front elevation showing the provision of a heating coil opposite to a lower member of the metallic container in a second embodiment of the adhering step of the process of this invention.
Figure 6:
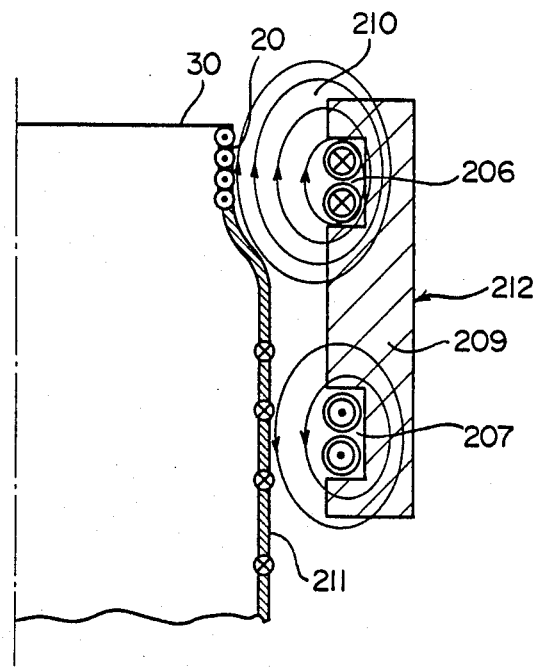
FIG. 6 is a vertical sectional view of principal parts taken along line VI—VI of FIG. 5.
Figure 7:
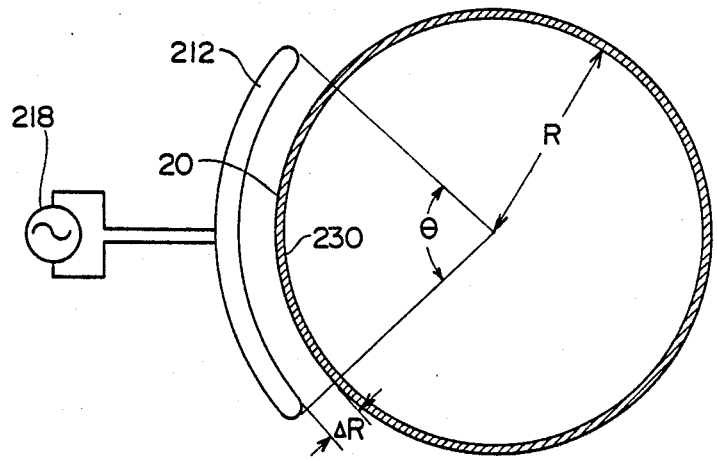
FIG. 7 is a transverse sectional view taken along line VII—VII of FIG. 5.

As shown in FIGS. 5 to 7, there is provided a high frequency induction heating coil 212 which is in a flat vortical shape. That part 206 of the heating coil 212 which faces the open end portion 20 of the lower member 14 is formed in an arcuate shape concentric with the open end portion 20. That part 207 of the heating coil 212 which faces the side wall 211 of the lower member 14 is also formed in an arcuate shape concentric with the side wall 211.

FIG. 6 shows an electric current and a magnetic flux in the heating coil and an induced current generated in the lower member 14 in the above arrangement of the heating coil 212 and the lower member 14 at some point of time. The directions of the induced currents generated in the open end portion 20 and the side wall 211 are opposite to those of the currents flowing through the portions 206 and 207 of the heating coil 212, respectively. The temperature distribution of the open end portion 20 in the axial direction can be adjusted by changing the relative positions of the outside edge 206a of the portion 206 of the heating coil 212 and the end edge 30 of the open end portion 20 of the lower member. If the position of the outside edge 206a is outwardly of the end edge 30 of the open end portion 20, the magnetic flux goes over to the end edge 30 of the open end portion 20 and gathers there in a greater amount. As a result, the temperature of the open end portion 20 becomes progressively higher toward the end edge 30. Even when the position of the edge 206a of the portion 206 is in alignment with that of the end edge 30 of the open end portion 20, the magnetic flux density of the end edge 30 increases because of the magnetic flux 210 which goes over to the end edge 30. In this condition, the end edge 30 is heated to the highest temperature. On the other hand, as the edge 206a of the portion 206 is shifted toward the side wall 211 of the lower member 14, the rise of the temperature of the end edge 30 decreases, and the open end portion 20 is heated nearly uniformly over a width nearly equal to the width (W) of the portion 206.

Since the magnetic flux goes over to the open end portion 20, this portion has a high magnetic flux density and the induced current is concentrated. But the current density is low because the induced current generated in the side wall 211 of the lower member 14 facing the portion 207 of the heating coil diffuses. Accordingly, the side wall 211 is hardly heated.

As the length of the portion 206 of the heating coil 212 becomes larger within a certain range, the current density at the open end portion 20 becomes higher and the heating efficiency becomes better. However, when this length exceeds one-half of the circumference of the open end portion, the current goes round the circumference of the open end portion. Thus, the effect of the magnetic flux going over to the end edge 30 of the open end portion becomes weak, and it is difficult to adjust the temperature distribution.

In FIG. 6, a magnetic core 209 made of a material having a high magnetic permeability such as ferrite is provided. The magnetic core 209 serves to strengthen the electromagnetic coupling of the portions 206 and 207 of the heating coil 212 respectively with the open end portion 20 and side wall 211 of the lower member, and thereby to increase the heating efficiency.

As shown in FIG. 7, the induction heating of the open end portion 20 is carried out by providing the portion 206 of the heating coil 212 opposite to a portion 230 of the open end portion 20 which is smaller than one-half of the circumference of the open end portion 20, and rotating the open end portion 20 with respect to the fixed heating coil 212. When the portion 206 of the heating coil 212 faces the entire circumference of the open end portion 20 or more than one-half of its circumference, a whirling current which whirls along the entire circumference of the side wall 211 of the lower member 14 is induced and the induced current flowing through the open end portion 20 becomes low. It is difficult therefore to heat the end portion 20 selectively to a predetermined temperature within a short period of time.

The length of the portion 206 of the heating coil 212 facing the open end portion 20 is preferably shorter than one-half of the circumference of the open end portion. More preferably, as shown in FIG. 7, when the radius of the open end portion 20 is R, the clearance $\Delta R$ between the portion 206 and the open end portion 20 is desirably not more than R/4, and the angle $\theta$ between straight lines formed by connecting the center of the open end portion 20 and both ends of the portion 206 is desirably 30 to 150 degrees, especially 40 to 100 degrees.

If the angle $\theta$ is less than 30 degrees, the entire length of the heating coil 212 is electromagnetically coupled with the lower member 14. Consequently, the current is not concentrated on the open end portion 20, and the side wall 211 is also strongly heated wastefully. Furthermore, since the heating coil 212 becomes smaller, the coefficient of electromagnetic coupling between the heating coil 212 and the lower member 14 decreases and the heating efficiency is reduced.

When the lower member 14 is at rest, the density of the current induced in the open end portion 20, and therefore the heating temperature of the open end portion 20, are highest at a portion facing the longitudinal center of the portion 206, and become lower at portions away from the center. However, by rotating the lower member 14 relative to the heating coil 212 provided as described above, the entire periphery of the open end portion 20 can be heated uniformly within a short period of time.

If the number of rotations of the lower member 14 from the beginning to the end of heating is small, the rise in the temperature of the open end portion 20 may become non-uniform. Uniform heating of the open end portion 20 becomes possible when the above number of rotations is 5 to 25, preferably 10 to 15. If the number of rotations is less than 5, the amount of heating tends to become non-uniform along the circumferential direction. On the other hand, when the number of rotations is larger than 25, slippage occurs between the lower member 14 and the holder. As a result, some period of time is required before the lower member 14 can be rotated stably, or the stopping of its rotation becomes difficult. The temperature distribution of the open end portion 20 in the circumferential direction tends to become non-uniform.

High frequency currents to be passed through the heating coil 212 may be any of those which are used in this kind of induction heating. For example, high frequencies of 10 KHz to 500 KHz are conveniently used.

Figure 9:
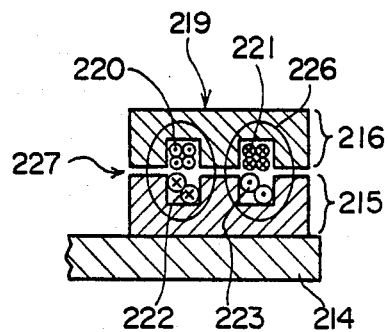
FIG. 9 is a sectional view taken along line IX—IX of FIG. 8.
Figure 8:
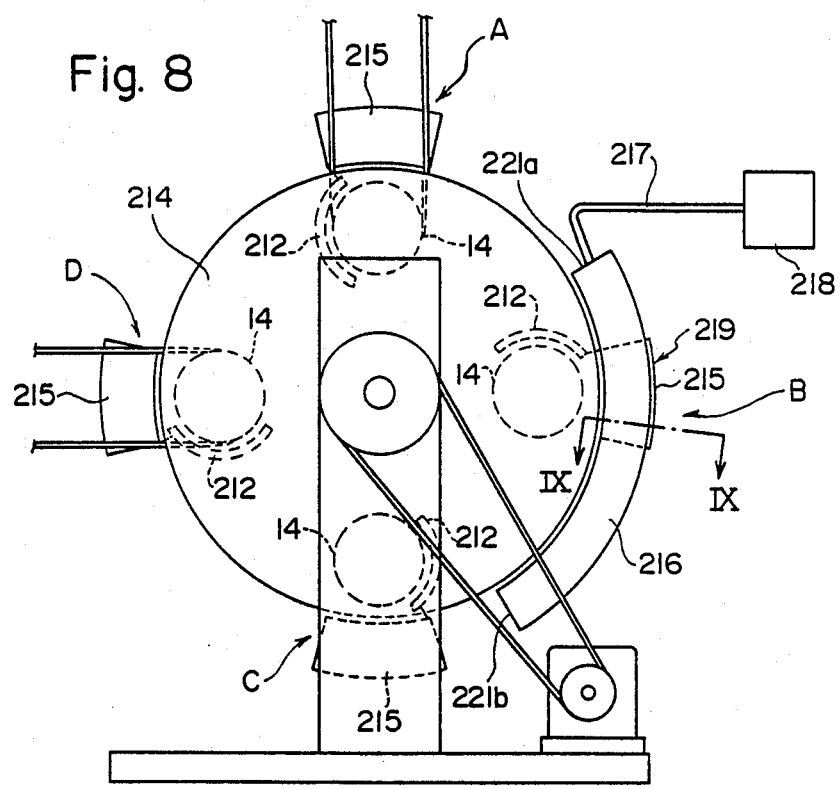
FIG. 8 is a view showing the second embodiment of the adhering step of the process of this invention.

With reference to FIGS. 8 and 9, a method of heating the open end portion 20 of the lower member 14 by using the high frequency induction heating coil 212 and continuously adhering the film-like adhesive to the open end portion will be described.

In FIG. 8, A represents a charging station for charging the lower member 14; B, a heating station; C, a heat-adhering station; and D, a delivery station. A plurality of (four in the drawing) arcuate heating coils 212 for heating the open end portion 20 of the lower member 14 are fixed to a rotating plate 214. Each heating coil 212 is connected to a high-frequency oscillating device 218 through a secondary coil member 215, a primary coil member 216 included in a primary coil holding member (not shown) which is fixed to the heating station B between the charging station A and the heating station C so as to face the secondary coil member 215 (a kind of rotating transformer 219 is formed of the primary coil member 216 and the secondary coil member 215; the transformer 219 rotates because one coil member 215 is provided on the rotating plate 214), and a feeder 217. The primary coil member 216 is always energized during the operation.

In FIG. 9, the rotating transformer 219 is provided with the primary coil member 216 comprised of one primary winding 20 and an arcuate magnetic core 221 (made, for example, of ferrite) having an E-shaped cross section and the secondary coil member 215 comprised of secondary windings 222 connected respectively to the heating coils 212 and magnetic cores 223 (made, for example, of ferrite) having an E-shaped cross section. The magnetic cores 223 are fixed to the rotating plate 214 along a circle about the center of rotation of the rotating plate 214, and secondary windings 222 are connected respectively to the heating coils 212. The arcuate magnetic core 221 is fixed by a holding member (not shown) in a current passing area of the heating coil 212 in proximity to the magnetic core 223.

The lower member 14 is rotated about its axis by a motor (not shown) while it is conveyed from the charging station A to the heat-adhering station C.

When the secondary windings 222 come under the inlet side 221a of the primary coil member 216, the current passing through the primary winding 220 causes the magnetic flux 226 passing through the magnetic core 221 to pass through the magnetic core 223. As a result, a secondary current is generated in the secondary winding 222 to energize the heating coil 212 connected to this secondary winding 222 (in FIG. 8, that heating coil which passes near the heating station B).

During this time, a current is passed through the heating coil 212, and the open end portion 20 is uniformly heated along its entire circumference to a heat-adherable temperature (a temperature higher than the melting or softening point of the thermoplastic resin which constitutes the film-like adhesive). After the secondary winding 222 has passsed the outlet side 221b of the magnetic core 221, the heating coil 212 connected to this secondary winding is deenergized.

Then, the lower member 14 is sent to the heat-adhering station C, and the film-like adhesive 16 is heat-adhered to the open end portion 20.

If required, the securing position of the rotating transformer is adjusted so as to maintain the heating coil 212 energized at the time of heat-adhering. This prevents the non-adhered portion of the open end portion 20 from being cooled to below the heat-adherable temperature. At the time of heat-adhering, the open end portion 20 is in the state of having already been heated to a predetermined temperature, and it is only sufficient to give the open end portion that quantity of heat which makes up for the quantity of heat radiated. The quantity of heat to be given to the open end portion 20 is adjusted by adjusting the electromagnetic coupling of the primary coil member 216 and the secondary coil member 215 of the rotating transformer 219. Specifically, this can be achieved by adjusting the gap 227 between the magnetic core 221 of the primary coil member 216 and the magnetic core 223 of the secondary coil member 215.

After the heat-adhering operation, the adhered film-like adhesive is cooled and solidified before it reaches the delivery station D.

Since the rotating transformer is used in the above heat-adhering operation, the current to be supplied to the heating coil can be switched on and off without turning the high frequency current of the power supply on and off, and also the magnitude of the current can be easily adjusted. Usually, when the high frequency current is turned on and off, the oscillating conditions are disturbed to damage the high frequency power supply, and therefore a special device is required. This necessity, however, is obviated in the aforesaid embodiment of this invention.

The lower member 14 delivered from the delivery station D is then subjected to the subsequent bending step. In the bending step, that part of the heat-adhered film-like adhesive which protrudes outwardly of the open end portion 20 is bent inwardly to protect the end edge 30. Thus, the lower member 14 having such a structure that the film-like adhesive is also heat-adhered to the inside surface of the open end portion 20 as shown in FIG. 1 is obtained.

In the above embodiment, the open end portion of the lower member 14 can be heated continuously with the desired temperature distribution by passing a current to the high frequency induction heating coils provided along the rotating plate while they are moved together with the lower member 14. Furthermore, the lower member 14 can be taken out after the heat-adhered layer has been cooled to a temperature lower than the melting or softening point of the film-like adhesive.

Since a plurality of the high frequency induction heating coils are used, when one heating coil is deenergized, another heating coil is energized. Thus, the high frequency power supply can be effectively utilized, and a high production speed can be achieved.

As the number of windings of the flat vortical heating coil increases, the current flowing through the flat vortical coil to supply the same quantity of heat to the material to be heated decreases. Hence, the power losses at the feeder for supplying power and at the rotating transformer decrease. Since the temperature of the heating coil rises as a result of its power loss, a copper pipe is usually used as a current conductor of the heating coil. Since it is cooled with water, its diameter should be large, and therefore the number of windings is limited.

In the above embodiment, the heating coils are intermittently used, and their temperature elevation is little. Hence, they can be used with air cooling, and the number of windings of the heating coils can be increased.

The heating method described above is not limited to the heat adhering of a plastic film, but can be applied to all instances where it is desired to heat the open end portion of a metallic hollow cylindrical blank with the desired temperature distribution continuously and efficiently. The portion 207 of the heating coil 212 may be of any desired shape. The shape of the heating coil 212 as a whole may be a rectangle, a square, or a nearly arcuate shape. Furthermore, the heating coil is not limited to one having two windings, and may be wound through one, three or more turns.

folding step

In the folding step, the protruding portion 40 of the film-like adhesive 16 adhered to the periphery of the lower member 14 in the adhering step is folded inwardly so as to envelop the end edge 30 of the open end portion 20 of the lower member 14 and the inner circumferential surface 23 following it, and melt-adhered to these parts.

In the aforesaid adhering step, the film-like adhesive 16 is melt-adhered to the periphery of the open end portion 20 of the lower member 14, but a part of it is not melt-adhered but protrudes outwardly to form the protruding portion 40, as shown in FIG. 10.

The protruding portion 40 is folded radially inwardly by inserting the open end portion 20 of the lower member 14 into a bending tool, i.e. a die 42. The die 42 has a hole portion 48 for insertion of the open end portion, a stepped portion 50 extending radially inwardly following the hole portion 48 and a hole portion 52 for insertion of a mandrel following the stepped portion 50.

The hole portion 48 has a truncated conical guide surface 54 and a short cylindrical guide surface 56. The inside diameter of the short cylindrical guide surface is nearly equal to $D_2+2t$ where $D_2$ is the outside diameter of the open end portion 20 and t is the thickness of the film-like adhesive 16. In other words, it is set at such a size as to receive the open end portion 20 having the film-like adhesive 16. heat-adhered to its peripheral surface.

The axial length of the short cylindrical guide surface 56 is shorter than the open end portion 20. The guide surface may be formed only of the truncated conical guide surface 54 without providing the short cylindrical guide surface 56. The provision of the short cylindrical guide surface 56, however, is effective because it can serve to accurately bend the film-like adhesive 16 whose bendability is not so good, or when an overlapping portion occurs in the film-like adhesive 16 heat-adhered to the peripheral surface of the open end portion 20, the guide surface 56 serves to secure a uniform thickness along the entire circumference by crushing the overlapping portion, or the guide surface 56 can prevent deformation of the open end portion 20 at the time of pressing the folded protruding portion 40 against the inner circumferential surface of the open end portion 20 by a mandrel 46 to be described below.

The radial width of the stepped portion 50 is set at a value substantially equal to the sum of the thickness of the open end portion 20 and the thickness t of the film-like adhesive 16. Accordingly, when the open end portion 20 is inserted into the die 42 from the hole portion 48, it collides with the stepped portion 50, and the protruding portion is bent nearly radially inwardly and the base portion 58 of the proruding portion 40 is held between the stepped portion 50 and the end edge 30 of the open end portion 20.

The hole 52 for insertion of a mandrel has a short cylindrical guide surface 62 and a truncated conical guide surface 64 for guiding the mandrel 46, which are contiguous to the stepped portion 50. The inside diameter of the short cylindrical guide surface 62 is substantially equal to the inside diameter $D_3$ of the open end portion 20 of the lower member 14.

The die 42 includes a high frequency induction heating coil 66 surrounding the short cylindrical guide surface 56 in proximity thereto. The heating coil 66 is adapted to heat the open end portion 20 to the heat-adherable temperature (i.e., the melting or softening point) of the resin which forms the film-like adhesive 16. The die 42 is formed of a material having strength and heat resistance and incapable of being heated by high frequency induction, such as ceramics, bakelite and fluorine resins.

The mandrel 46 is nearly cylindrical as a whole, as shown in FIG. 12, and is provided with a rigid core portion 70 and a sleeve 72 made of a heat-resistant elastic rubber. The sleeve 72 is comprised of a tapered portion 74 formed at its end and a cylindrical portion 76. The presence of the tapered portion 74 permits easy insertion of the mandrel into the hole portion 52. The outside diameter of the cylindrical portion 76 is set at $D_3-2t$ (the difference obtained by subtracting two times of the thickness t of the film-like adhesive 16 multiplied from the inside diameter $D_3$ of the open end portion 20) or above. As shown in FIG. 13, when the mandrel 46 is inserted into the die 42 from the hole portion 52, the sleeve 72 can fold the protruding portion 40 extending nearly radially inwardly, and can elastically press the folded protruding portion 40 while holding it between the inner circumferential surface 23 of the open end portion 20 and the sleeve 72. At this time, that portion of the film-like adhesive which is adhered to the peripheral surface of the open end portion 20 is supported by the short cylindrical guide surface 56 of the hole portion 48.

The elastic rubber forming the sleeve 72 is desirably one having high heat resistance, high abrasion resistance, and excellent removability from the film-like adhesive 16 which has been solidified after melting or softening, for example fluorine rubbers or silicone rubbers. The rubber has a Shore A hardness of preferably 30 to 90 degrees, more preferably 60 to 80 degrees. If its hardness is lower than 30 degrees, it is too soft and a sufficient elastic pressing force is difficult to exert. If its hardness is higher than 90 degrees, it is too hard and is difficult to push into the folded protruding portion 40.

As shown in FIG. 13, when after the insertion of the mandrel 46, a current is passed through the heating coil 66, the open end portion 20 is heated by induction to a temperature at which the film-like adhesive 16 can be adhered. Thus, the base portion 58 of the protruding portion 40 is heat-adhered to the end edge 30 of the open end portion 20, and the remaining protruding portion 40, to the inner circumferential surface of the open end portion 20, both under pressure.

In other words, the folded film-like adhesive 16 is heated by the mandrel 46 while, it is pressed uniformly along its entire circumference radially outwardly from inside.

Preferably, the heating is done while at the same time as the above pressing, the film-like adhesive 16 is pressed radially inwardly from outside by the die 42. By keeping the film-like adhesive 16 pressed from outside from before the heating, the thermal expansion of the lower member 14 at the time of heating can be restrained. As a result, a uniform pressing force is generated radially inwardly. Since the periphery of the open end portion 20 of the lower member 14 is in contact with the die 42, the distance between the high frequency heating coil 66 in the die 42 and the open end portion 20 can be maintained constant, and the entire periphery of the open end portion 20 can be uniformly heated. The heating temperature and the pressing force are controlled so that the thickness of the film-like adhesive 16 does not substantially vary during the heat-adhering step. After the heat-adhering, the heating coil 66 is deenergized to cool and solidify the film-like adhesive 16. Then, the mandrel 46 and the lower member 14 are pulled out from the die 42.

Since as stated above, the heat-adhering of the film-like adhesive is carried out under a moderate elastic pressing force, creases or bubbles do not occur in the heat-adhered film-like adhesive 16, and the adhesive 16 does not become thin nor is it broken at a corner portion of the end edge 30.

Bonding step

In the bonding step, the open end portion 20 of the lower member 14 is fitted into the open end portion 18 of the upper member 12.

In order to obtain a suitable bond strength, it is necessary as stated above that a mutual pressure should exist at the fitting portion. For this purpose, the aforesaid interference s should exist.

Some embodiments of fitting will be described below.

Figure 14:
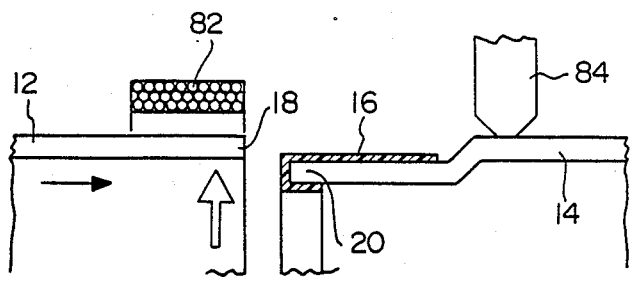
FIG. 14 is a simplified view showing a first embodiment of fitting.

In a first embodiment of fitting shown in FIG. 14, the open end portion 18 of the upper member 12 is heated by a heating coil 82 to enlarge the diameter of the open end portion 18. Then, the open end portion 20 of the lower member 14 to which the film-like adhesive 16 has been melt-adhered in the above adhering step and folding step is inserted into the open end portion 18 of the upper member 12. Subsequently, the open end portion 18 is cooled. As a result, the upper member 12 and the lower member 14 are fitted. Preferably, a diameter adjusting ring 84 is used so that at the time of fitting, the lower member 14 is deformed uniformly.

Figure 15:
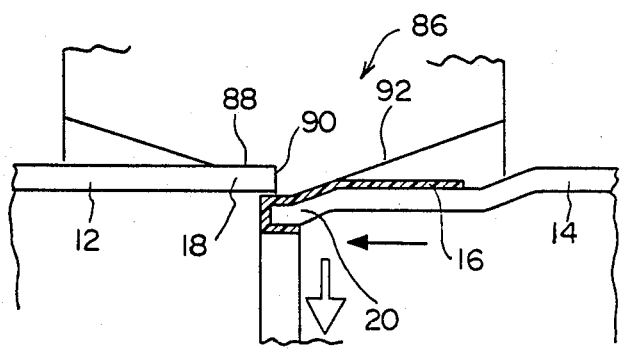
FIG. 15 is a simplified view showing a second embodiment of fitting.

In a second embodiment of fitting shown in FIG. 15, a split fitting die 86 is used, as shown in FIG. 15. The split fitting die 86 has a cylindrical guide surface 88 for fitting the upper member 12 therein, a stepped portion 90 contiguous to the cylindrical guide surface 88 which extends radially inwardly and has a width equal to, or slightly larger than, the thickness of the open end portion 18 of the upper member 12, and a truncated conical guide surface 92 contiguous to the stepped portion 90 and extending outwardly. While the fitting die 86 is in the compressed state, the open end portion 18 of the upper member 12 is advanced until its end surface abuts against the stepped portion 90 of the die 86. Then, from the side of the truncated conical guide surface 92, the open end portion 20 of the lower member 14 enveloped with the film-like adhesive 16 is advanced and fitted into the open end portion 18 of the upper member 12 while it is drawn by the truncated conical guide surface 92. The compression of the split fitting die 86 may be relieved after the fitting portion of the open end portion 20 of the lower member 14 has been partially or completely fitted into the open end portion 18 of the upper member 12. The cylindrical guide surface 88 and the truncatred conical guide surface 92 of the fitting die 86 have a nearly true circular sectional shape, whereby the open end portions 18 and 20 are concentrically and uniformly deformed.

Figure 16:
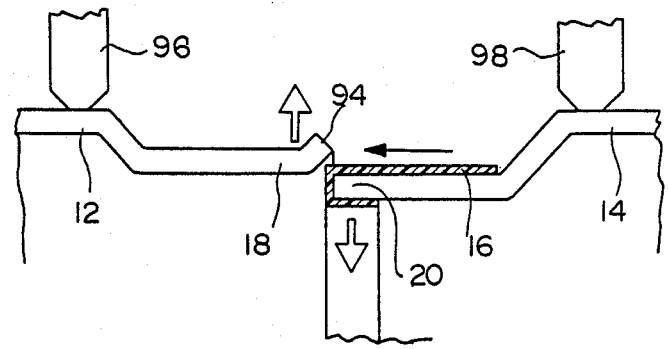
FIG. 16 is a simplified view showing a third embodiment of fitting.

According to a third embodiment of fitting shown in FIG. 16, a curled portion 94 is provided at the open end portion 18 of the upper member 12, and by utilizing the curled portion 94, the upper member 12 and the lower member 14 are fitted. Specifically, the curled portion 94 spreading radially outwardly is formed at the open end portion of the upper member 12. The upper member 12 and the lower member 14 are supported firmly so that their central axes are in alignment. Along the central axis, the two members are caused to approach each other, and the open end portion 20 of the lower member 14 is fitted into the open end portion 18 of the upper member 12. The two members are preferably supported by diameter adjusting rings 96 and 98 so that they are uniformly deformed at the time of fitting.

As stated above, in the adhering step and the folding step, the end edge 30 of the open end portion 20 of the lower member 14 is enveloped with the film-like adhesive 16. Then, the open end portion 20 of the lower member 14 is fitted into the open end portion 18 of the upper member 12. The presence of the film-like adhesive 16 makes the fitting easy, and at the time of fitting, makes it possible to prevent the end edge 30 of the open end portion 20 from injuring the upper member 12.

The fitting of the upper and lower members 12 and 14 is not limited to the three specific embodiments described above. To avoid any deleterious effect by heating, for example the degeneration of the film-like adhesive 16, cold fitting, for example as in the second and third embodiments described above, is preferred to hot fitting, for example as in the first embodiment described above.

Then, the fitted portion is heated while a mutual pressure is exerted thereon. Consequently, the adhesive present in the fitted portion is melted and the two members are bonded.

Figure 17:
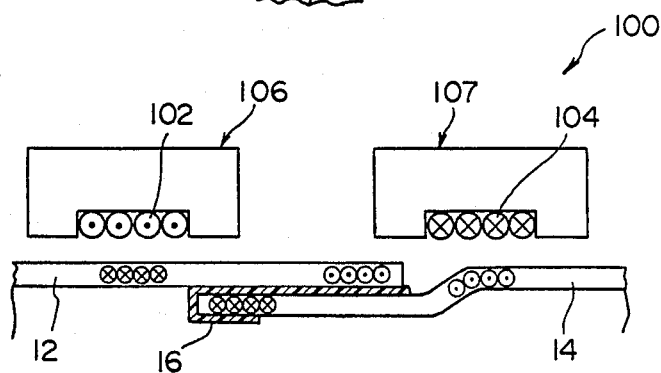

Heating of the fitted portion is carried out by using a heating device 100 shown in FIG. 17, for example. The heating device 100 heats the fitted portion of the upper member 12 and the lower member 14 by high frequency induction. The heating device 100 has two high frequency induction heating coils 102 and 104 and magnetic cores 106 and 107 surrounding the coils 102 and 104. As shown in FIG. 17, the heating device 100 is positioned so that the central portions of the coils 102 and 104 face the fitted portion. While a reversely directed current is passing through the two coils 102 and 104, the fitted upper member 12 and lower member 14 are rotated about the central axis thereof (FIG. 18). In this manner, the fitted portion is heated to a temperature at which the adhesive can be melt-adhered. Then, the fitted portion is cooled and solidified to bond the two members at the fitted portion.

Now, referring to FIGS. 19 to 27, another embodiment of the bonding step will be described.

As stated above, the film-like adhesive is heat-adhered to the peripheral surface of the open end portion 20 usually subjected to a diameter reducing processing operation leaving a protruding portion, and the protruding portion is bent and heat-adhered to the end surface 30 and the inner circumferential surface 23 [see FIG. 19(a)] to protect the end surface 30 at which the substrate metal is exposed. However, because of a burr 30a protecting outwardly as shown in FIG. 19(a), the plastic tape (i.e., the film-like adhesive) locally breaks during the bending operation, and a part of the end surface 30 is exposed to form a defective bonded portion. At the same time, metal-metal contact may occur between the burr 30a and the inside surface of the open end portion 18.

Or as shown in FIG. 19(b), because of poor alignment of the upper member 12 and the lower member 14 at the time of fitting operation, the adhesive layer and a coated film on the periphery of the open end portion 20 are shaved off by the insided end corner 18a of the outside open end portion 18 to form a defective bonded portion. As a result, metal-metal contact may occur between the open end portions 18 and 20.

Or as shown in FIG. 19(c), the excessive force needed for pushing of the lower member 14 into the inside of the upper member 12 may produce a container having an insufficient height. As a result, metal-metal contact may occur between the inside end corner 18a of the open end portion 18 and the outside surface of the tapered portion 20a of the open end portion 20. The aforesaid phenomenon of insufficient height also occurs when the height is insufficient at the reduced diameter portion owing to a mistake in the diameter reducing operation. When the height of the container is insufficient, a sufficient axial load cannot be exerted at the time of applying a cap to the pouring mouth portion 11 (FIG. 23), and poor sealing tends to occur.

According to the other embodiment of the bonding step, inspection of the bonded container for the aforesaid defective bonded portions can be carried out, for example during the bonding operation.

In FIGS. 20 and 21, the same reference numerals as in the drawings described hereinabove represent the same parts. FIGS. 20 and 21 show that the upper member 12 and the lower member 14 are fitted through the film-like adhesive 16, and the fitted portion 305 of the resulting container is heat-bonded by heating it with a high frequency induction heating coil 306. The heating coil 306 having a plurality of windings (three windings in the drawing) is provided such that its upper horizontal portion 306a faces the body wall portion 302 of the upper member 12 relatively in proximity to the open end portion 18 of the upper member 12, and its lower horizontal portion 306b faces the body wall portion 303 of the lower member 14 relatively in proximity to the open end portion 20 of the lower member 14 (so that the distance between the upper horizontal portion 306a and the open end portion 18 becomes substantially equal to the distance between the lower horizontal portion 306b and the open end portion 20).

Figure 25:
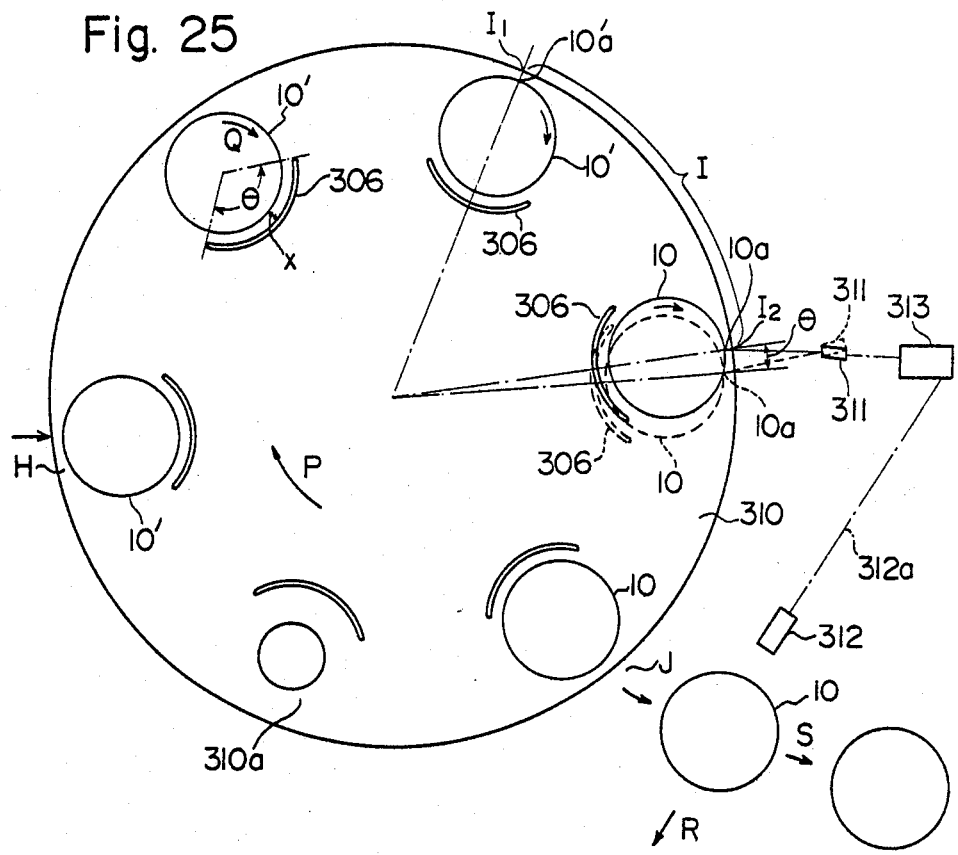
FIG. 25 is a top plan view of an apparatus used to practice still another embodiment of the bonding step of the process of this invention.

The heating coil 306 is formed in an arcuate shape as viewed from above and concentrically with a container assembly 10' so that the central angle θ of its vertical portions 306c and 306d with respect to the axis of the container assembly 10' is about 40 to about 180 degrees (see FIG. 25). Desirably, a magnetic core such as a ferrite core (not shown) is provided in the heating coil 306 in order to increase the current efficiency.

In heat-adhering the fitted portion 305, a current is passed through the heating coil 306 while the container assembly 10' is rotated about its own axis. If the fitted portion 305 is sound without metal-metal contact, an induced current 307 passing through the open end portion 18 flows near that part of the body wall portion 302 of the upper member 12 which faces the heating coil 306, and an induced current 308 passing through the open end portion 20 flows near that part of the body wall portion 303 of the lower member 14 which faces the heating coil 306. The strength of the induced current 307 is substantially equal to that of the induced current 308. Since the directions of currents flowing through the upper horizontal portion 306a and the lower horizontal portion 306b of the heating coil 306 are opposite to each other, the direction of that part of the induced current 307 which is at the open end portion 18 is opposite to the direction of that part of the induced current 308 which is at the open end portion 20.

Figure 22:
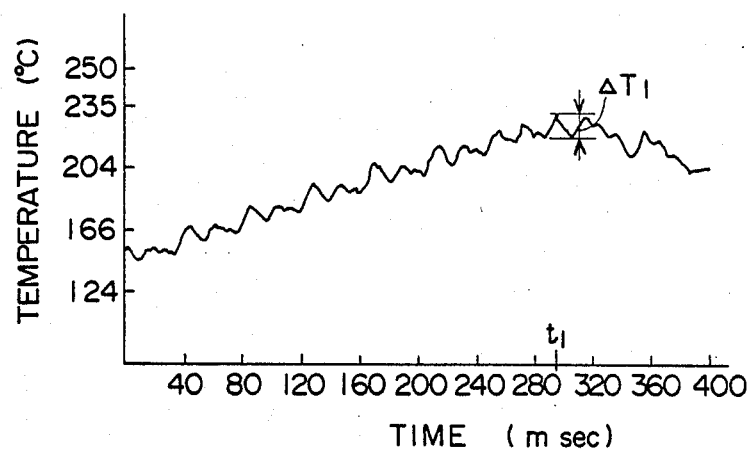
FIG. 22 is a diagram showing an example of variations of the normal fitted portion of a metallic container with time when it is heated with rotation in accordance with the embodiment shown in FIG. 20.

When the fitted portion 305 (i.e., the bonded portion) is sound, the heating temperature along the circumferential direction thereof is relatively uniform. An example of this is shown in FIG. 22. A container assembly 10' having an outside diameter of 122 mm and made of an aluminum alloy plate (JIS 3004 H19) having a thickness of 0.23 mm (the height of the fitted portion 305 is 5 mm) is rotated on its own axis at a rotating speed of 1,400 rpm, and a high frequency power (300 KHz, 4 KW) is supplied to the container assembly 10' for 1 second using a heating coil 306 of the type shown in FIG. 20 [central angle θ=100° having 3 windings; the distance x between the heating coil 306 and the fitted portion 305 (FIG. 25)=3 mm; a ferrite core is used]. The surface temperature of the fitted portion 305 is measured by an infrared radiation thermometer provided at a fixed position. The measured temperatures are plotted in FIG. 22. With regard to the abscissa showing the time, one interval of the scale corresponds to 40 msec, and the time required for one revolution of the fitted portion 305 is about 43 msec. The time $t_1$ is the time when the supply of current was stopped. It is seen from FIG. 22 that the fluctuation width $\Delta T_1$ of the temperature during one rotation of the fitted portion 305 during and immediately after heating is about 15° C.

Figure 23:
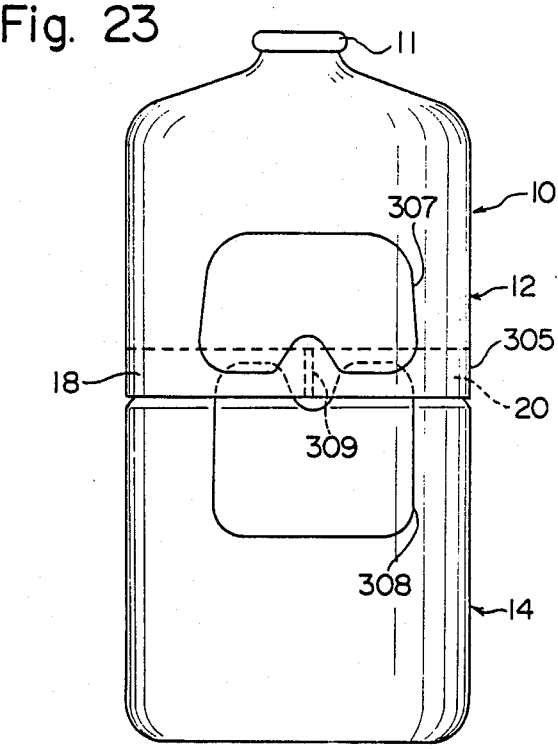
FIG. 23 is a front elevation of a metallic container showing an induced current generated when the vicinity of that part of the fitted portion of the container at which metals contact each other is heated in accordance with the embodiment shown in FIG. 20.

FIG. 23 shows the flows of the induced currents 307 and 308 when a metal-metal contacting portion 309 exists part of in the fitted portion 305 and the metal-metal contacting portion 309 comes to a position opposite to the heating coil (omitted in FIG. 23). The induced currents 307 and 308 flowing in opposite directions detour away from the metal-metal contacting portion 309 to avoid collision at the metal-metal contacting portion 309. Hence, the heating temperature is lower in the vicinity of the metal-metal contacting portion 309 than at normal portions, and consequently, the heating temperature at the fitted portion 305 along the circumferential direction varies by a greater amount during or immediately after heating.

Figure 24:
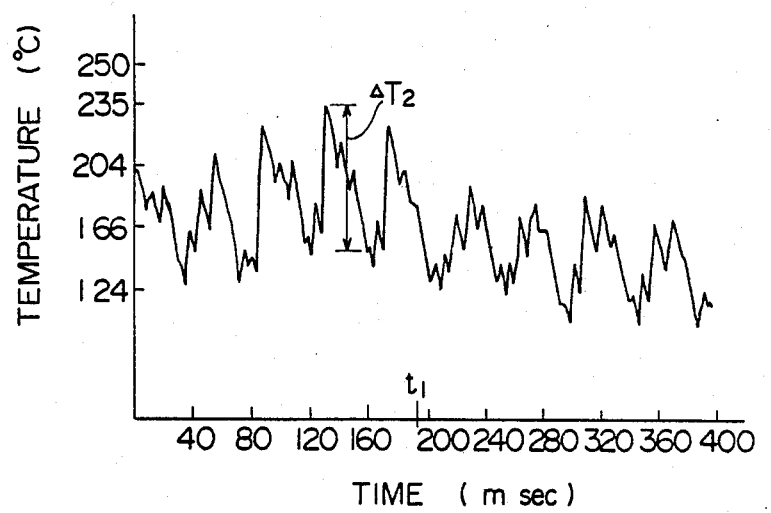
FIG. 24 is a diagram showing an example of variations of the temperature of the fitted portion of a metallic container with time when it is heated with rotation in accordance with the embodiment shown in FIG. 20.

FIG. 24 shows the surface temperature of the fitted portion 305 having one metal-metal contacting portion 309 during rotation which was measured in the same way as in the case of FIG. 22. The variation width $\Delta T_2$ during one rotation is about 75° C. which is much larger than in the case of FIG. 22. The time $t_1$ in FIG. 24 shows the time at which the supply of current was stopped.

Sometimes, a sound fitted portion 305 may undergo metal-metal contact when the adhesive layer is melted or softened during heating. If this happens, the metal-metal contacting portion shorts and an excessively large current flows in that part, resulting in local temperature elevation, the occurrence of bubbles in the adhesive layer, or charring of the paint film. Hence, a defective bonded portion forms. In this case, too, the amount of temperature variation during one rotation of the fitted portion 305 increases.

Accordingly, the defective bonded portion can be detected by determining whether the amount of temperature variation during one rotation of the fitted portion 305 during or immediately after heating is within a predetermined tolerable range.

Figure 26:
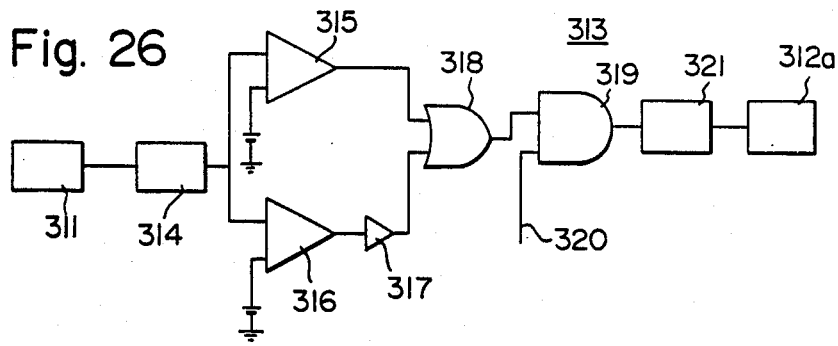
FIG. 26 is a block diagram of a discrimination circuit used in the apparatus of FIG. 25.

FIGS. 25 and 26 show an example of devices for practicing the method according to the aforesaid embodiment.

In FIG. 25, the reference numeral 310 represents a turret along the peripheral portion of which six pockets 310a for accomodating the container assembly 10' are provided at equal intervals. The turret 310 rotates continuously at a fixed speed in the direction of arrow P. A heating coil 306 is provided for each pocket 310a. At a charging station H, the container assembly 10' is charged into the pocket 310a. Immediately after charging, the container assembly 10' is rotated about its own axis at a fixed speed in the direction of arrow Q by means of a driving device (not shown).

In a heating station I, the heating coil 306 is energized when the outermost end 10'a of the container assembly 10' reaches its start end position $I_1$, and the heating coil 306 is deenergized when the outermost end 10'a reaches its termination end position $I_2$. During passage through the heating station I, the fitted portion 305 of the container assembly 10' is heat-adhered and bonded and a metallic container 10 having a bonded portion is formed.

A temperature sensor 311 (such as an infrared radiation thermometer or a roller-type thermometer having a thermocouple embedded therein) is disposed outwardly of the turret 310 and in proximity to the termination end portion $I_2$ of the heating station I. In FIG. 25, the metallic container 10 shown by a dotted line at the termination end portion $I_2$ is at a position which it occupies after the metallic container 10 shown by a solid line has rotated through one turn. In other words, during one rotation of the metallic container 10, it moves by an amount corresponding to the central angle $\theta$ of the turret 310 owing to the revolution of the turret 310. The temperature sensor 311 is adapted to repeat oscillation or movement (for example at a frequency of 60 times per minute) following the movement of the metallic container 10 by the revolution of the turret 310 so that after the metallic container has been rotated through one turn, it can measure the temperature of the outermost end 10a of the bonded portion before the rotation.

The reference letter J designates a delivery station. Of the metallic containers 10 delivered from the delivery station, those which have a defective bonded portion are discharged in the direction R by a rejecting device 312 on the basis of a rejection signal 312a outputted from a discrimination circuit 313. On the other hand, those having a sound bonded portion are delivered in the direction S without rejection, and sent to the next step.

FIG. 26 shows the discrimination circuit 313. The discrimination circuit 313 includes the temperature sensor 311, a temperature monitor 314 having the function of amplifying the output voltage of the temperature sensor 311, comparators 315 and 316 which respectively compare voltages corresponding to the tolerable upper limit temperature ($T_a$, for example 250° C.) and the tolerable lower limit temperature ($T_b$, for example 204° C.) with the voltage inputted from the temperature monitor 314, and an inverter 317 adapted to input a signal 1 (one) into an OR gate 318 when the temperature (T) measured by the temperature sensor 311 is higher than the upper limit temperature ($T_a$) or lower than the lower limit temperature ($T_b$).

The illustrated discrimination circuit 313 also includes an AND gate 319 into which an output signal from the OR gate 318 and a signal 320 are inputted. The signal 320 is an output signal from a proximity switch (not shown) provided at the termination end portion $I_2$ of the heating station I. The proximity switch is on only during the time when the metallic container 10 shown by the solid line at the termination end portion $I_2$ moves to the position shown by the dotted line, namely during one rotation of the metallic container 10. Accordingly, when during one rotation of the metallic container 10, a temperature higher than the upper limit temperature ($T_a$) or lower than the lower limit temperature ($T_b$) is detected by the sensor 311, a signal 1 is outputtted from the AND gate 319. When the temperature detected by the temperature sensor 311 is between the upper limit temperature ($T_a$) and the lower limit temperature ($T_b$), a signal 0 (zero) is outputted from the AND gate 319.

The discrimination circuit 313 further includes a delay circuit 321 in which a time delay corresponding to the time required for the metallic container 10 at the terminal end portion ($I_2$) to reach a position opposite to the rejecting device 312 is set. Accordingly, a metallic container 10 for which the sensor has detected a temperature outside the range between the upper limit temperature ($T_a$) and the lower limit temperature ($T_b$) along the bonded portion is rejected by the rejecting device 312 on the basis of the rejecting signal 312a from the discrimination circuit 313.

Figure 27:
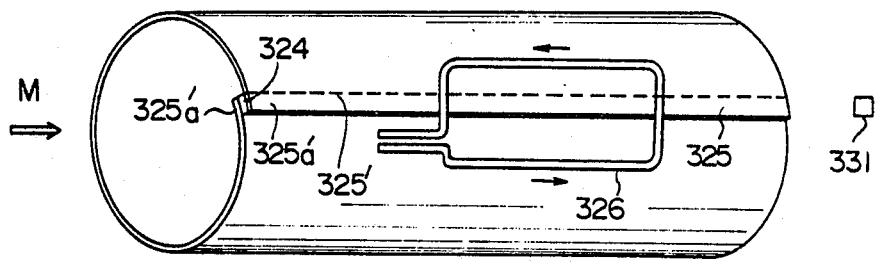
FIG. 27 is a top plan view for illustrating the inspection of the bonded portion of the body portion of a container in the other embodiment of the above bonding step mentioned in regard to FIG. 25.

The aforesaid method can also be applied to the inspection of defects of the bonded portion 325 when as shown in FIG. 27, a metallic can body blank 321' having a side lap portion 325' formed therein by overlaying both side marginal portions 325'a with an adhesive layer 324 is moved in the direction of arrow M and the lap portion 325' is heated by an induction heating coil 326 and bonded to produce a metallic can body having a lap side seam 325. In this case, the width of variations of the heating temperature along the entire length of the lap side seam 325 is measured by the temperature sensor 331 provided opposite to the lap side seam portion 325 on the outlet side of the heating coil 326, and discriminated by the discriminating circuit described above.

According to this embodiment, the bonded portion is inspected for a defect at the time of heat bonding, and therefore, no special inspection step is required. The overall manufacturing process can therefore be simplified. Moreover, the occurrence of defects having serious effects on the performance of containers in a step of forming a thermoplastic polymeric adhesive layer in the lower member of the container, and a step of forming a lap portion (for example, a fitted portion) can be examined all at one time during heat bonding without the need to examine it in the above steps (inspections in these steps require complex procedures).

The inspection is simple because it only involves detecting the heating temperature at the bonded portion and judging its variation along the lengthwise direction thereof. Thus, the above method has the advantage that all of the bonded portions of container bodies can be continuously and automatically inspected on the line. Another advantage of the inspection method according to the above embodiment is that poor bonded portions formed owing to overheating or insufficient heating of the entire bonded portion (owing, for example, to an excessively high or low output of the heating coil, or the improper setting of the distance between the container member and the heating coil) can be inspected at the same time.

Metallic containers

Figure 28:
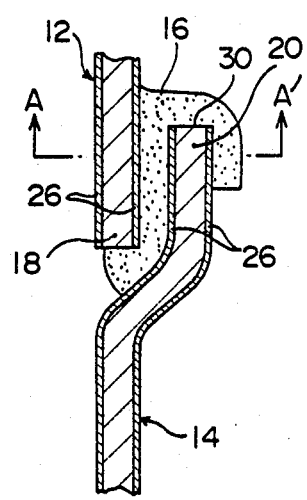
FIG. 28 is an enlarged vertical sectional view of a metallic container in accordance with one embodiment of this invention.
Figure 29:
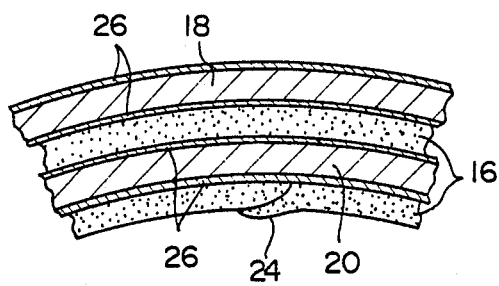
FIG. 29 is an enlarged transverse sectional view of the bonded portion taken along line A—A' of FIG. 28.

One example of the bonded portion of the metallic container 10 in accordance with this invention which is produced as above is shown in FIGS. 28 (longitudinal section) and 29 (transverse section).

In the metallic container, the adhesive in that portion which is interposed between the open end portion 18 of the upper member 12 and the open end portion 20 of the lower member 14 undergoes a compression force by the open end portions 18 and 20 and is heated in the bonding step, etc. Hence, the thickness of the overlapping portion of the film-like adhesive 16 is nearly equal to the thickness of the other parts of the adhesive 16. On the other hand, at that part of the adhesive 16 which is folded inwardly, the thickness of the overlapping portion 24 is larger than the thickness of the other parts.

As shown in FIG. 28, a protective layer or a primer layer 26 is formed on the outside walls and inside walls of the open end portions 18 and 20. However, when the cylindrical open end portions of the container members are lap-bonded, the end edge of the metallic blank is naturally exposed at the inside of the seam.

In the metallic container according to one specific embodiment of this invention, the film-like adhesive 16 is adhered to the end edge 30 of the inside open end portion 20 and the inner circumferential surface contiguous to the end edge 30 with a circumferential overlapping portion 24. The length of the overlapping portion 24 is preferably 0.1 to 10 mm, especially preferably 0.5 to 5 mm, in view of the accurate adhesion of the film-like adhesive to itself and of economy. Because of the provision of the overlapping portion 24, the end surfaces of the film-like adhesive do not separate from each other in various processing steps or during use of the container, and the end edge 30 having no protective coating of the open end portion 20 is not exposed. The overlapping portion 24 is heated while undergoing a pressing force from inside and outside in the folding step for example. Hence, at the overlapping portion 24, the film-like adhesive 16 firmly adheres to itself and the primer layer 26 firmly adheres to the film-like adhesive 16. Since the overlapping portion 24 is thicker than the other parts, a pushing force acts especially strongly on it, and the aforesaid adhesion is carried out with a bonding force at least equivalent to that at the other parts.

Accordingly, the container according to this invention can be used especially suitably as a container for holding perishable goods, or as a container for holding goods having an autogenous pressure such as carbonated beverages, beer, sparkling wine, etc.

Examples and Comparative Examples

Example 1

An aluminum alloy plate (JIS 3004, H26) having a thickness of 0.23 mm coated on both surfaces with an organosol-type coating agent was punched and drawn in a customary manner to produce a cup-like metallic cylindrical body having an outside diameter of 84.11 mm. Then, by a diameter reduction processing operation, an open end portion (outside diameter 83.65 mm, length 5 mm) was formed in the cylindrical body. Thus, a lower member 14 of the shape shown in FIG. 1 was produced.

The lower member 14 was charged into a holder 127 of a conveying device 113 in an apparatus 110 of the type shown in FIGS. 2 and 3, and a mandrel 129 (with a heat insulating layer 129b of a Teflon lining having a thickness of 3 mm and an outside diameter of 83.60 mm) was inserted into the open end portion 20.

In the meantime, a modified linear polyester tape (softening point 178° C.) having a thickness of 80 microns and a width of 6 mm was fed into a feed roll device 111, and cut by a cutter on the roll 144 to form a film-like adhesive 16 in the form of a tape having a length of 265 mm.

A heating coil 131 was provided so that the central angle became 100 degrees, the distance between it and the open end portion 20 was 3 mm, the circumferential distance of that part of the open end portion 20 which faced the lower end portion $131_{a2}$ of the heating coil 131 from the heat-adhering site S' was 66 mm.

The upper limit ($T_y$) of the heat-adherable temperature at this time was 260° C., and its lower limit ($T_x$) was 195° C.

The time required for the lower member 14 to reach the heat-adhering station S from the charging station by revolution was 3 seconds, and during this time, the lower member 14 rotated through six turns on its own axis (at a rotating speed of 120 rpm). The open end portion 20 was pre-heated to 190°–220° C. (the temperature $T_2$ of FIG. 4) by the heating coil 131 at an output of 3.5 KW.

As soon as the lower member 14 reached the heat-adhering station S, the output of the heating coil 131 was lowered to 1.5 KW. The lower member 14 was kept rotating, and as soon as the film-like adhesive 16 on the adhering roll 116 was heat-adhered along the open end portion 20, the heating coil 131 was deenergized When the temperature of the open end portion 20 was measured by an infrared radiation thermometer during an operation in which the film-like adhesive 16 was not heat-adhered, it was 220° to 245° C. at that part of the open end portion 20 which faced the lower end portion $131_2$ of the heating coil 131. The temperature dropped by about 15° C. before reaching the heat-adhering site S', and therefore the above temperature was 205° to 230° C. at the heat-adhering site S'.

The heat-adhered film-like adhesive did not develop bubbles nor did it have poor adhesion, and changes such as heat degradation and heat decomposition were not observed in the primer coating.

Examples 2 and 3 and Comparative Example 1

In the following examples, filled containers were tested for the following items after they were stored at 37° C. for 6 months. Ten container samples were used for testing each of the amount of metal (iron, aluminum) dissolved, flavor, discoloration, the condition of the inside of the container, and deformation strength. These items were evaluated as follows:

Amount of metal dissolved

The proportion (ppm) of the amount (mg) of metal dissolved in 1000 g of the contents.

Flavor

A flavor test was conducted by a panel of 10 specialists, and the results were evaluated on the following scale.
5: Excellent
4: Good
3: Fair
2: Poor
1: Very poor Discoloration Change in the color of the contents Condition of the inside surface of the container After opening the container, its inside bonded portion was evaluated visually with regard to the condition of rust occurrence, a change in the coating, etc.

Deformation strength

An iron weight having a tip radius of 10 mm and a weight of 4 kg was let fall from a height of 30 mm onto the bonded portion of a filled container, and the deformation strength of the container was evaluated by the occurrence of leakage.

Example 2

A modified vinyl-type lacquer was coated on both surfaces of a tin-plated steel plate having a substrate thickness of 0.23 mm and baked. The coated plate was punched into a disc having a diameter of 94 mm, and press-formed in a customary manner to produce an upper member having a pouring port provided in an upper wall (the inside diameter of the upper member 64.12 mm).

On the other hand, a tin-plated steel plate having a substrate thickness of 0.30 mm was punched out into a disc having a diameter of 120 mm, and shaped into a cup having an inside diameter of 85 mm by a conventional press-forming technique. The cup-like fabricated article was then redrawn and ironed by using an ironing punch having a diameter of 66.10 mm and an ironing die. The inside and outside surfaces of the cup-like fabricated article were degreased and washed, and subjected to a surface treatment in a customary manner (using a phosphate compound). Then, a modified vinyl-type lacquer was coated on its inside and outside surfaces and baked, and then subjected to a neck-in processing to produce a lower member having a neck-in outside diameter of 64.11 mm with a neck-in straight portion having a length of 4.5 mm.

A film-like adhesive was adhered to the periphery of the open end portion (neck-in portion) of the lower member in the following manner so that a circumferential overlapping portion having a length of 2.5 to 3.0 mm was formed. Specifically, a modified polyester-type film-like adhesive (softening point 180° C.) having a width of 6 mm and a thickness of 80 microns was cut to a length of 205 mm. The lower member was heated by a high-frequnecy heating coil disposed to locally surround the periphery of the open end portion of the lower member so that the temperature of the adhering site became 210° to 230° C. Then, the film-like adhesive was adhered to the periphery of the open end portion of the lower member. At this time, the circumferential overlapping portion of the adhesive had a length of 2 to 3 mm, and the protruding length of the adhesive from the open end portion was 1.5 mm.

Then, the protruding portion of the film-like adhesive adhered to the open end portion was bent radially inwardly by a bending tool (having a guide hole with an inside diameter of 64.27 mm and a circumferential stepped portion with a height of 0.20 mm following the guiding hole). Then, a core (outside diameter 64.10 mm) having a rubber surface was inserted into the inside of the open end portion, and the protruding portion was bent axially inwardly. By a high frequency heating coil embedded in the bending tool, the entire circumference of the film-like adhssive was heated to 190° to 210° C., and the film-like adhesive was melt-adhered to the inner wall of the open end portion.

The open end portion of the lower member to which the film-like adhesive was applied as above was reduced in diameter, and fitted in the open end portion of the upper member. Then, while a mutual pressure was exerted on the fitted portion, the fitted portion was heated at 200° to 215° C. by means of a high frequency heating coil disposed opposite to the periphery of the fitted portion while rotating the fitted assembly, thereby to melt the adhesive. The adhesive was then cooled and solidified and the upper member was bonded to the lower member to produce a metallic container having a capacity of about 500 ml.

The bonded portion of the container was cut out and its inside was examined. It was found that the film-like adhesive completely adhered to the coating on the inside surface of the container. The film-like adhesive had an overlapping portion having a length of 2 to 3 mm, and at this portion, the adhesive completely adhered to itself.

Cola, beer and a synthetic carbonated drink, while cold, were filled in containers obtained by the above-mentioned technique, and their pouring ports were sealed. These containers were heat-sterilized under the conditions shown in Table 1.

TABLE 1

| Contents | Sterilizing device | Temperature (°C.) | Autogenous pressure (kg/cm$^2$) |
|---|---|---|---|
| Cola | Can warmer | 41 | 7.0 |
| Beer | Pasteurizer | 62 | 6.0 |
| Synthetic carbonated drink | Can warmer | 41 | 7.8 |

During the treatment, no peeling of the circumferential bonded portion nor leakage at that portion was observed.

These containers were packed into cartons (10 cases; 24 cans/case) and stored at 37° C. for 6 months, and the amount of iron dissolved, flavor, discoloration, the condition of the inside surface of the containers and deformation strength were examined. The results are shown in Table 2.

It is seen from Table 2 that since the inside end portion of the bonded portion of the containers obtained in accordance with this invention was fully protected, the amount of metal dissolved in the contents was small, and the containers have resistance to the contents, and that furthermore, since no corrosion occurred, the containers had excellent sealability and bond strength.

Comparative Example 1

An upper member and a lower member were produced in the same way as in Example 2. A modified polyester-type film-like adhesive (softening point 180° C.) having a width of 6 mm and a thickness of 80 microns was cut to a length of 201.3 mm, and adhered to the periphery of the neck-in portion of the lower mmmber by the same method as in Example 2 except that the ends of the film-like adhesive butted against each other without forming a circumferential overlapping portion. The protruding length of the adhesive from the open end portion was 1.5 mm.

The protruding portion of the film-like adhesive was melt-adhered to the inner wall of the open end portion in the same way as in Example 2.

The lower member was fitted in the upper member and then they were heat bonded to form a metallic container having a capacity of about 500 ml.

The bonded portion of this container was cut out and its inside was examined. Frequently, the circumferential end portions of the film-like adhesive did not completely melt-adhere to each other, or the end portions of the adhesive separated from each other. Therefore, the end surface of the open end portion was not completely protected.

Cola, beer and a synthetic carbonated drink were each filled in containers obtained as above. In some containers, leakage occurred from the bonded portion immediately after filling.

These containers were packed into cartons (10 cases, 24 cans/case) and stored at 37° C. for 6 months, and tested in the same way as in Example 1. The results are shown in Table 2.

It is seen from the results shown in Table 2 that since the inside end portions of the bonded portions in the containers outside the scope of this invention were not completely protected, the amount of metal dissolved in the content was large, and the containers had poor resistance to contents and to corrosion or leakage.

Example 3

An aluminum alloy (JIS 3004, H19) having a thickness of 0.23 mm and coated on both surfaces with an organosol-type coating agent was punched and drawn in a customary manner to form an upper member having an inside diameter of 121.90 mm at the end edge of that part which was to become a bonded portion and having a pouring port with a diameter of 38 mm at its center.

On the other hand, the same coated plate was punched and drawn to produce a lower member having an outside diameter of 121.90 mm at the end edge of that part which was to become a bonded part. A polyamide-type adhesive (softening point 185° C.) was extruded by an extruder equipped with a gear pump onto the periphery of the open end portion of the lower member so as to form a film-like adhesive layer having a width of 7 mm and a thickness of 100 microns. The overlapping portion of the adhesive in the circumferential direction was 2.5 to 3.0 mm, and the protruding length of the adhesive from the open end portion was 1.5 mm.

The protruding portion of the film-like adhesive adhered to the open end portion was bent inwardly in the same way as in Example 2 by using a bending tool (having a cylindrical guide surface with a diameter of 122.10 mm and a stepped portion with a height of 0.30 mm) and a rubber core (outside diameter 121.60 mm), and heated to 190° to 210° C. Thus, the film-like adhesive was melt-adhered to the inner wall of the open end portion.

The lower member was fitted in the upper member, and the fitted part was heated to produce a metallic container having a capacity of about 2 liters. The bonded portion of this container was cut out, and its inside was examined. It was found that the film-like adhesive completely adhered to the coating on the inner surface of the container over the entire circumference, and that the film-like adhesive had an overlapping portion having a length of 2.5 to 3.0 mm, and the adhesive at the overlapping portion adhered completely to itself.

Beer was filled in containers obtained as above, and the pouring ports were sealed up. The containers were sterilized at 65° C. for 30 minutes. During the treatment, no peeling of the circumferential bonded portion nor leakage at that part occurred. These containers were stored at 37° C. for 6 months, and then, the amount of aluminum dissolved, flavor, discoloration, the condition of the inside surface of the containers and deformation strength were examined. The results are shown in Table 3.

It is seen from the results given in Table 3 that since the inside end portion of the bonded portion was completely protected in the containers in accordance with this invention, the amount of metal dissolved in the contents was small, and that since they had excellent resistance to the contents and did not undergo corrosion, they had excellent sealability and bond strength.

TABLE 2

| | | Results of storage test | | | | |
|---|---|---|---|---|---|---|
| | Contents | Amount of iron dissolved (ppm) | Flavor | Discoloration | Condition of the inside surface | Deformation strength |
| Example 2 | Cola | 0.37 | 5 | None | No change | No leakage |
| | Beer | 0.10 | 5 | None | No change | No leakage |
| | Synthetic carbonated drink | 0.17 | 5 | None | No change | No leakage |
| Comparative Example 1 | Cola | 8.90 | 2 | None | Point corrosion occurred | Leakage occurred in 3 out of 10 cans |
| | Beer | 5.35 | 2 | Slightly cloudy | Point corrosion occurred | Leakage occurred in 2 out of 10 cans |
| | Synthetic carbonated drink | 7.75 | 2 | None | Point corrosion occurred | Leakage occurred in 5 out of 10 cans |

TABLE 3

| | | Results of storage test | | | | |
|---|---|---|---|---|---|---|
| | Contents | Amount of aluminum dissolved (ppm) | Flavor | Discoloration | Condition of the inside surface | Deformation strength |
| Example 3 | Cola | less than 0.01 | 5 | None | No change | No leakage |
| | Beer | less than 0.01 | 5 | None | No change | No leakage |

What is claimed is:

1. A process for producing a metallic container by lap-bonding a first and a second section each composed of a primer-coated metallic cup-like fabricated article at their circumferential open end portions by means of a thermoplastic film-like adhesive, which comprises:

a fabricating step of producing the first and second sections so that the inside diameter of the open end portion of the first section becomes nearly equal to the outside diameter of the open end portion of the second section;

rotating said second section about the central axis thereof;

feeding a length of the film-like adhesive to a heat adhering site along the periphery of the open end portion of the rotating second section;

an adhering step of heat-adhering the film-like adhesive to the peripheral surface of the open end portion of the second section, said adhering step comprising a preheating step of substantially uniformly preheating the open end portion of the second section along the circumference thereof to a temperature near the lower limit of temperatures at which the film-like adhesive can be heat-adhered, and a heat-adhering step of, immediately after the foregoing preheating step, heat-adhering the film-like adhesive to the open end portion of said second section at the heat adhering site by locally heating said open end portion of the second section by a high frequency heating coil while keeping said second section rotating about its central axis so that the open end portion of the second section at the heat-adhering site attains said temperatures at which the film-like adhesive will be heat-adhered; and a bonding step of fitting the open end portions of the first and second sections and bonding them.

2. A process as claimed in claim 1 wherein the adhering step comprises, for heating the open end portion of the second section, providing a high frequency induction heating coil on a rotating supporting stand and a secondary coil on the rotating supporting stand connected to the induction heating coil, rotating the supporting stand for passing the secondary coil past a fixed primary coil for supplying power to said induction coil as said supporting stand is moved past the primary coil, and carrying out said rotating of the open end portion of the second section in proximity to the thus powered induction heating coil for heating the entire circumference of said open end portion in the time the secondary coil takes to pass said fixed primary coil.

3. A process as claimed in claim 1 wherein in the adhering step, the film-like adhesive is adhered to the outer periphery of the open end portion of the second section with a part of the film-like adhesive protruding from the open end portion of the second section, and said process further comprising a folding step of simultaneously inwardly folding the entire circumference of that part of the film-like adhesive which protrudes from the open end portion of the second section so as to envelop the end of the open end portion of the second section and the inner circumferential surface extending from said edge, uniformly pressing the entire circumference of the open end portion of the second section with the film-like adhesive thereon radially from inside to outside thereof, and heating the entire circumference of the open end portion of the second section while continuing the pressing to a temperature at which the film-like adhesive can be melted, whereby the film-like adhesive is adhered to the inner circumferential surface of the open end portion of the second section.

4. A process as claimed in claim 3 wherein in the adhering step, the film-like adhesive is adhered with one end overlapping the other in the circumferential direction.

5. A process as claimed in claim 3 wherein the folding step for folding the protruding portion of the film-like adhesive protruding from the open end portion of the second section radially inwardly along its entire circumference comprises moving a bending tool, having a cylindrical hole with the forward end tapered inwardly to the cylindrical shape and a radially extending stepped portion at the inner end of the cylindrical hole, toward the open end portion of the second section until the stepped portion presses the folded over protruding portion against the end of the edge of the open end of said second section, and then moving a cylindrical inserting tool having the forward end tapered into said cylindrical hole toward said second section for uniformly pressing the entire periphery of the film-like adhesive against the inner surface of said open end portion of the second section, whereby the film-like adhesive is pressed uniformly both radially inwardly against the outside of the open end of said second section but radially outwardly against the inner surface of the open end, and said heating step comprises heating the entire periphery of the open end portion of the second section to a temperature in the range of 100° to 300° C. for melt adhering the film-like adhesive to the open end portion of the second section.

* * * * *